United States Patent
Tan et al.

(10) Patent No.: US 12,235,853 B1
(45) Date of Patent: Feb. 25, 2025

(54) MULTI-TIER SEARCH AND DELIVERY OF TRAVEL EXPERIENCES

(71) Applicant: Airbnb, Inc., San Francisco, CA (US)

(72) Inventors: Chun How Tan, South San Francisco, CA (US); Mihajlo Grbovic, Moss Beach, CA (US); Lu Cheng, San Francisco, CA (US)

(73) Assignee: Airbnb, Inc., San Francisco, CA (US)

( * ) Notice: Subject to any disclaimer, the term of this patent is extended or adjusted under 35 U.S.C. 154(b) by 868 days.

(21) Appl. No.: 16/452,444

(22) Filed: Jun. 25, 2019

(51) Int. Cl.
  *G06F 16/2457* (2019.01)
  *G06F 16/29* (2019.01)
  *G06N 20/20* (2019.01)
  *G06Q 30/0282* (2023.01)

(52) U.S. Cl.
  CPC ........ *G06F 16/24578* (2019.01); *G06F 16/29* (2019.01); *G06N 20/20* (2019.01); *G06Q 30/0282* (2013.01)

(58) Field of Classification Search
  CPC ... G06F 16/24578; G06F 16/29; G06N 20/20; G06Q 30/0282
  USPC .......................................................... 707/723
  See application file for complete search history.

(56) References Cited

U.S. PATENT DOCUMENTS

| | | | |
|---|---|---|---|
| 9,418,482 B1 * | 8/2016 | Yang | G06T 19/006 |
| 10,013,489 B2 * | 7/2018 | Jones | G06F 16/951 |
| 2010/0211308 A1 * | 8/2010 | Zheng | G01C 21/20 |
| | | | 707/E17.05 |
| 2012/0143882 A1 * | 6/2012 | Zheng | G06Q 10/08 |
| | | | 707/E17.069 |
| 2013/0073422 A1 * | 3/2013 | Moore | G06Q 50/01 |
| | | | 705/26.7 |
| 2013/0073686 A1 * | 3/2013 | Sandholm | G06F 16/9537 |
| | | | 709/219 |
| 2014/0025670 A1 * | 1/2014 | Daran | G06F 16/9537 |
| | | | 707/724 |
| 2015/0220836 A1 * | 8/2015 | Wilson | G06Q 30/0631 |
| | | | 706/46 |
| 2017/0048664 A1 * | 2/2017 | Zhang | G06F 16/90324 |
| 2020/0318983 A1 * | 10/2020 | Shirani-Mehr | G06V 20/56 |
| 2021/0070304 A1 * | 3/2021 | Weldemariam | B60W 40/06 |

* cited by examiner

*Primary Examiner* — Hosain T Alam
*Assistant Examiner* — Saba Ahmed
(74) *Attorney, Agent, or Firm* — Morgan, Lewis & Bockius LLP

(57) ABSTRACT

A system receives a query from a user specifying a geographic location at which the user wishes to obtain data relating to travel experiences. The system obtains a first score associated with a first travel experience and a second score associated with a second travel experience, the first score being different than the second. A score is based on at least one quality indicator of the experience. The system defines a plurality of differently-located virtual boundaries around the travel location, each successive boundary indicating an area located at a greater distance from the travel location. The system then displays to the user a list of experiences, wherein the experiences are rank-ordered before presentation to the user. The rank ordering of experiences is dependent on both the virtual boundary into which the experience falls and the score associated with the experience.

21 Claims, 7 Drawing Sheets

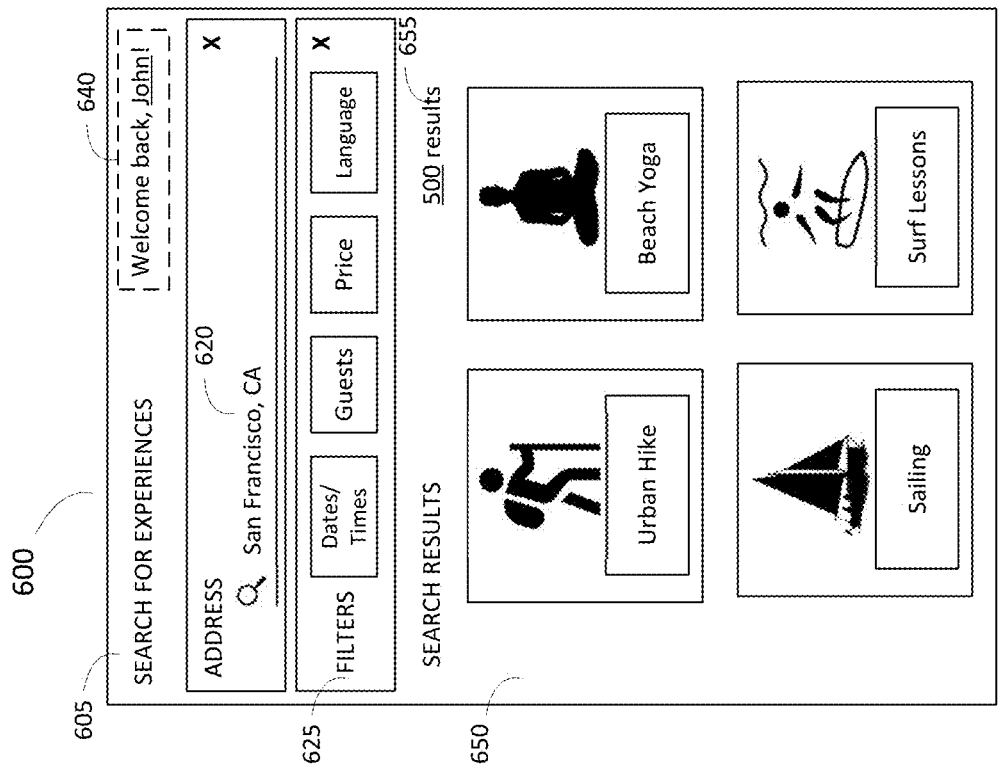
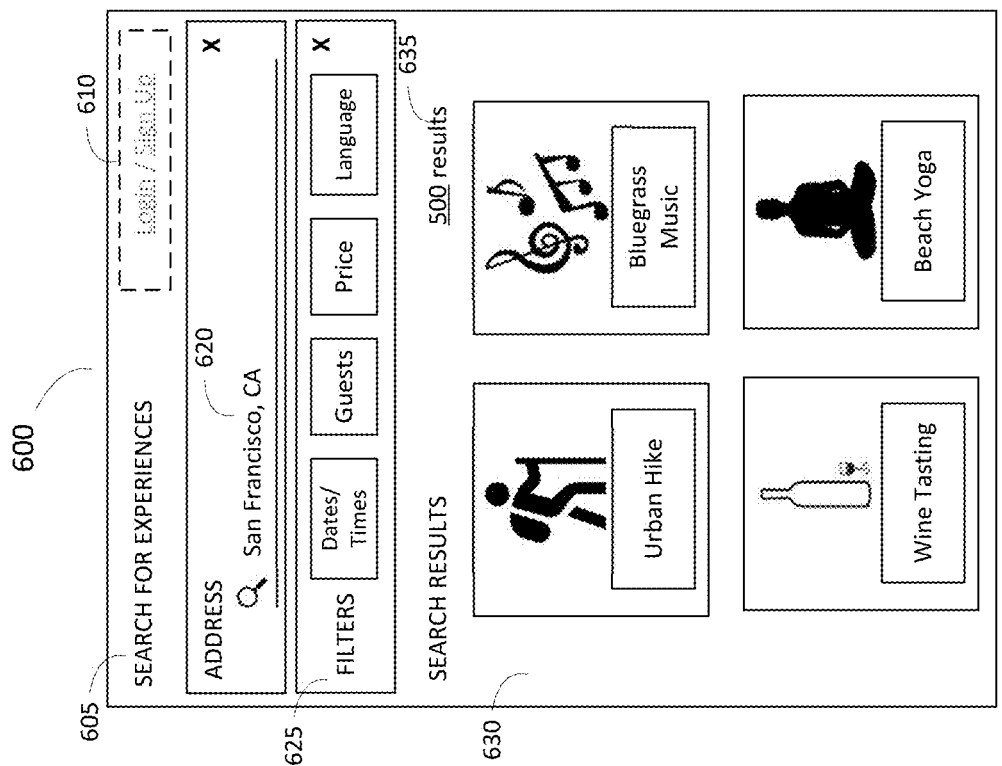
FIG. 6A
FIG. 6B

MULTI-TIER SEARCH AND DELIVERY OF TRAVEL EXPERIENCES

BACKGROUND

As travelers plan flights, travel, and/or accommodations at their travel destination, they may wish to also visit nearby experiences, locales, or highlights (such as sightseeing, sports, entertainment, historical, or other locations). Travel to these nearby locations may take the form of a day trip, that is, a relatively short trip of hours or days that need not necessitate extensive planned travel. In order to inform a traveler of potential nearby experiences and/or encourage the traveler to plan or reserve such experiences, a merchant may wish to limit their advertising to trips that are of interest to a traveler, while still being practical or feasible. Therefore, the process of recommending potential experiences may require intelligent selection.

In one known method for generating travel experience recommendations, an advertiser may recommend all experiences within a traveler's destination city or within a certain predetermined distance from the traveler's destination city. However, circumstances may exist where a potential experience is located at a position that is relatively close to a traveler's destination, but that is nonetheless difficult for the traveler to reach. As one example, while the distance between two Hawaiian Islands may be relatively small (e.g., within 100 miles), travel between the islands may require one or more flights, and may not be suitable for a day trip or quick travel experience. Similarly, two locations may be geographically close, while traffic or infrastructure conditions may nonetheless render travel therebetween prohibitively long or complex. In another known method, a travel agent may manually curate experiences tailored to an individual traveler's needs. Such manual solutions cannot be scaled, and/or may otherwise be limited in the information that may be considered. For instance, a single travel agent may only be familiar with experiences in a single market that may not sufficiently match with a traveler's intended destination.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure.

FIGS. 6A and 6B illustrate graphical user interfaces for displaying travel experiences in response to a user query in accordance with some embodiments of the present disclosure.

DETAILED DESCRIPTION

Figure 1:
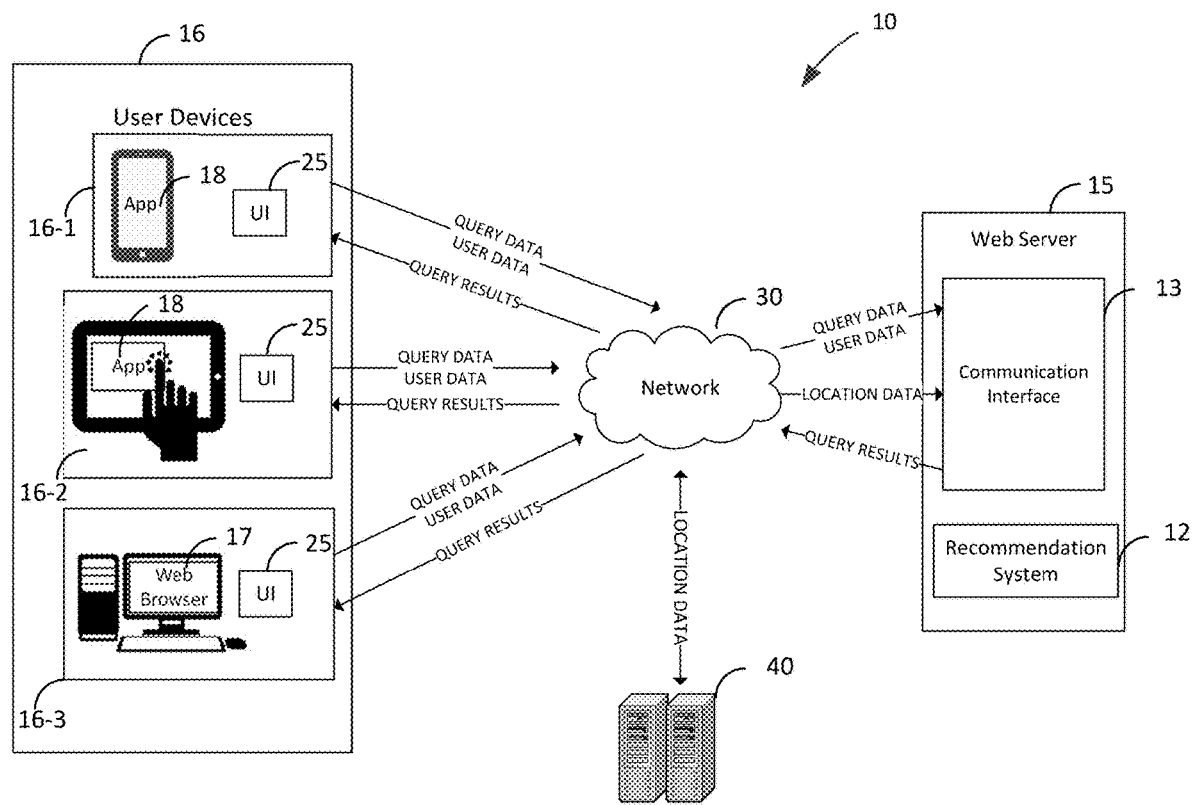
FIG. 1 is a block diagram illustrating an environment including a recommendation system, a user device, and a remote server in accordance with some embodiments of the present disclosure.

The present invention generally pertains to systems and methods for improving the retrieval and ranking of travel experiences for display to a user executing a query regarding travel in a particular geographic area. A database is built in which each travel experience is assigned values indicating the quality of the experience and values indicating whether the experience can be a good day trip for a particular traveler. The values indicating quality may be calculated based on structured information (e.g., category, number of visitors, etc.) and unstructured information (e.g., sentiment analysis of guest reviews, etc.) collected about the travel experience. These two values are reconciled with other factors using a weighted linear (or non-linear) analysis to generate a score for the travel experience, and based on that score, the experience is grouped into one of a plurality of categories (e.g., "star"/"popular"/"day trip," high/medium/low, or any number of categories, buckets, or types of identifies). In one embodiment, a user enters a query specifying a geographic area and a responsive set of area travel experiences are retrieved, with experiences from higher-scoring buckets being included from a greater distance radius from the specified geographic area than those from lower-scoring buckets.

In one embodiment, the retrieved travel experiences resulting from the query are ranked based on personalized signals about the user. These personalized signals may include, but are not limited to, e.g., whether the user is local/domestic/international with respect to the travel destination, the size of the user's group, the user's length of stay, the distance between the booked home (if any) and the experience, whether an experience is within the user's preferred categories, a calculated quality of the experience, whether and how frequently the experience was booked, the subjective impressions of travelers who have previously booked this experience, the previous booking experiences of the user, etc. In one embodiment, the ranking is performed per user, and in some cases, per day or per hour, to determine a ranked set of suitable day trip experiences. In some embodiments, this ranking may be performed using a supervised learning algorithm. By these means, a curated list of travel experiences can be presented to the user in association with their planned travel in real-time, the curation being automatic and therefore scalable.

In one embodiment, the provider of a service displaying travel experiences near a target travel destination is an online reservation system that provide listings of properties, such as houses, condominiums, rooms, apartments, lots, and other real estate, offered for reservation (sometimes referred to as a "booking" or "rental") for a specified time period (e.g., a day, week, month, or other period of interest). Such an exemplary online reservation system may display reservable properties to guests as property "listings," which contain respective information about the property such as price ranges, dates, number of bedrooms, and/or other factors that may be of interest to guests in making a reservation. Any single property may be located at a particular geographic position. A traveler searching for a property to book typically searches by geographic region. In some embodiments, the searched for geographic region or the particular geographic position of a booked property may thereafter act as a central point from which a pool of neighboring (or relatively neighboring) experiences may be determined.

FIG. 1 depicts, in accordance with an embodiment of the present disclosure, an environment 10 for generating a set of recommended experiences to deliver to a user of a user device 16, the user being a person using a device with a user interface (of, e.g., an app or web browser) to plan travel to a particular geographic location. As shown in FIG. 1, a recommendation system 12 may be implemented by a web server 15 or other type of device or system that is connected to a network 30. Additionally connected to network 30 is at least one remote server 40. Network 30 may comprise one or more network types, such as a wide area network (such as the Internet), a local area network (such as an intranet), a cellular network or another type of wireless network, such as Wi-Fi, Bluetooth, Bluetooth Low Energy, and/or other close-range wireless communications, a wired network, such as fiber optics and Ethernet, or any other such network, or any combination thereof. In some embodiments, the network 30 may be the Internet and payment and information may be communicated between system components in an encrypted format such by a transport layer security (TLS) or secure socket layer (SSL) protocol. In addition, when the network 30 is the Internet, the components of the environment 10 may use the transmission control protocol/Internet protocol (TCP/IP) for communication.

In the embodiment of FIG. 1, recommendation system 12 (a component part of web server 15) are managed or facilitated (and in some embodiments, owned) by a travel-directed service provider. The travel-directed service provider may be generally understood as an individual or organization interested in delivering to the user information, advertisements, or other communication for one or more travel-dependent products, experiences, events, and the like to a user or potential customer in response to a query sent from a user device. In some embodiments, the service provider may be a merchant or entity that uses or runs an e-commerce website or app, through which customers may buy, sell, rent, lease, and/or otherwise purchase or subscribe to the provider's products or services. In one exemplary embodiment, the provider may provide an online reservation system that shows listings of properties, such as houses, condominiums, rooms, apartments, lots, and other real estate that has been offered for reservation and that may be reserved for a specified time period (e.g., a day, week, month, or other period of interest).

In one exemplary embodiment, the provider may display to the user information for one or more particular properties in response to a user query regarding, e.g., a geographic location, and, in correlation with the display of that information to the user, may also display a ranked list of travel experiences, targeted toward the user, that are neighboring to the queried geographic location. In another exemplary embodiment, the provider may display to the user a ranked list of travel experiences regarding a specified location, separate from any information regarding one or more particular properties. In some embodiments, the display of a ranked list of travel experiences may be displayed to a user in response to user activity, such as, e.g., the user's viewing of a webpage or a property listing associated with a geographic region or area, the user's interactions with the provider's website or e-commerce interface, such as searching or filtering against an index of properties (or data associated therewith), locations, and/or dates/date ranges, among many other things.

As shown in FIG. 1, web server 15 may have a communication interface 13 via which the web server may receive query data and/or user data from and transmit query results to one or more user devices 16-1, 16-2, 16-3, referred to herein individually or collectively as user device(s) 16. A user device 16 may be used by individuals or entities (referred to herein as "users") to access, view, and/or take action in response to content delivered to the user from the web server 15. A user device 16 may be implemented by one or more computing devices, such as a smartphone or other hand-held device (e.g., a tablet or reader), desktop computer, laptop computer, touchscreen device, or any other appropriate device capable of receiving, processing, and outputting digital information via network 30. In an exemplary embodiment, the user device 16 presents information to a user via a display on or connected to the device 16, and takes input from the user in relation thereto (for example, through interactive graphics or hyperlinks) via a touchscreen, mouse, keyboard, stylus, or any other appropriate input device.

Web server 15 may also use communication interface 13 to transmit and receive location data from one or more remote computer systems 40. The location data exchanged with remote system 40 may include current or historical data associated with a particular geographic location, such as any of map information about a location, traffic information, and/or weather information, among other things.

In the illustrated embodiment, each user device 16 may have installed a web browser 17 and/or other appropriate applications 18 that can be used to communicate (receive and transmit data) with the web server 15 via the network 30. In some embodiments, app 18 may be a mobile application or other software application distinct from a generic web browser, such as an e-mail, messaging, or social media application, an application specific to the advertiser or an e-commerce business, or another program capable of receiving digital content from the marketing system 13 and delivering such content to the user of the device. In some embodiments, the user device 16 may present to the user a user interface 25 (e.g., a graphic user interface, through app 18 or web browser 17) through which the customer can view, search against, buy, sell, rent, lease, and/or otherwise purchase or subscribe to the provider's products or services. That is, user interface 25 may provide one or more components of a point-of-service (POS) system between the service provider managing the web server 15 and the user. In some examples, a user device 16 may also transmit or receive information with the web server 15 via email, instant messaging, or other type of electronic communication, or via voice, SMS, voicemail, or any other appropriate type of communication. While FIG. 1 illustrates a one-to-one correspondence between a user device 16 and one of a web browser 17 or app 18, the exemplary embodiment is not so limited. For instance, a user device 16 may in one embodiment be a smartphone on which several apps 18 are installed (e.g., Facebook, web browser, e-commerce app, etc.), each of which may serve as a channel over which the user may interact with the service provider. Further, while FIG. 1 illustrates only three user devices 16 and one web server 15 connected to network 30, it may be understood that any number of users and any number of servers may be variously configured in different embodiments.

Figure 2:
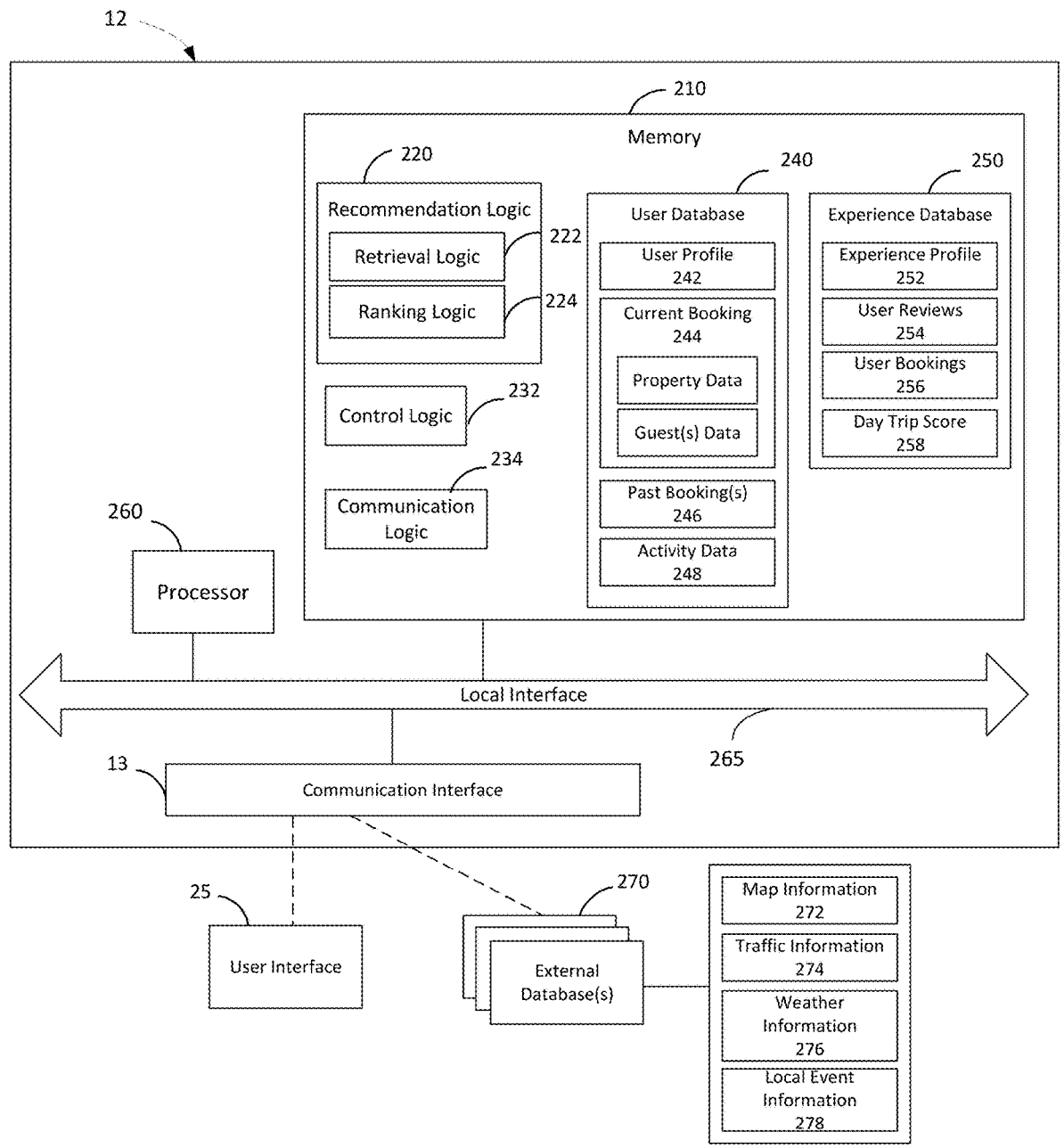
FIG. 2 is a block diagram illustrating certain components of a recommendation system in accordance with some embodiments of the present disclosure.

FIG. 2 depicts an example schematic diagram of certain components of recommendation system 12 in accordance with some embodiments of the present disclosure. The recommendation system 12 may include a memory 210. As used herein, memory 210 may refer to any suitable storage medium, either volatile and non-volatile (e.g., RAM, ROM, EPROM, EEPROM, SRAM, flash memory, disks or optical storage, magnetic storage, or any other tangible or non-transitory medium), that stores information that is accessible by a processor. Memory 210 may store instructions used in the systems and methods described herein. While FIG. 2 illustrates a single discrete memory 210, it will be understood that the embodiments described herein are not limited to any particular arrangement and that other embodiments may store information in one combined memory, or with information stored in a different configuration in one or more memories, some local to the other components illustrated in FIG. 2 and/or some shared with, or geographically located near, other computing systems.

The illustrated embodiment depicts a number of modules stored in memory 210, specifically, recommendation logic 220, retrieval logic 222, ranking logic 224, control logic 232, and communication logic 234. These depicted modules may variously represent one or more algorithms, computational models, decision making rules or instructions, or the like implemented as software code or computer-executable instructions (i.e., routines, programs, objects, components, data structures, etc.) that, when executed by one or more processors, program the processor(s) 260 to perform the particular functions of their respective logic. It may be understood that these modules are depicted in FIG. 2 as several discrete components, each labelled as an individual "logic", however, in various embodiments, the functions of each respective logic may be executable on their own or as part of one or more other modules; that is, any configuration of the depicted logical components may be used, whether implemented by hardware, software, firmware, or any combination thereof. The capabilities of these various logics are described in greater detail below.

The recommendation system 12 may include control logic 232, including one or more algorithms or models for generally controlling the operation of the recommendation system 12. The memory 210 may also, in one embodiment, include communication logic 234, including one or more algorithms or models for obtaining information from or communicating information to one or more of the user devices 16 or remote systems 40 via network 30 (FIG. 1). Furthermore, the recommendation system 12 may have a communication interface 52 to exchange data with various components and/or devices on the network 30. For instance, communication interface 52 and communication logic 332 may be used (by, e.g., retrieval logic 222 and/or ranking logic 224, in the manner(s) described in greater detail below), to access data from one or more external databases 270 (through network 30) and to present or intake data via user interface(s) 25, such communication being illustrated in FIG. 2 as dotted lines. While communication logic 234 is illustrated as being a separate logical component, in an alternative embodiment, the recommendation system 12 may include communication logic 234 as part of recommendation logic 220 or control logic 232. In another alternative embodiment, the communication logic 234 may communicate with third-party systems and/or may coordinate with the control logic 232 to read or write data to memory 210 or to another data repository (not shown) within the recommendation system 12.

In some embodiments, the recommendation system 12 may be implemented in whole or in part as a machine learning system (e.g., neural network software) for achieving the functionalities described herein. In one embodiment, one or more of retrieval logic 222 and ranking logic 224 (or any subset of any of those logics) may be implemented at least in part as one or more machine learning algorithms, as described in more detail below.

While, in the exemplary embodiment, each of retrieval logic 222, ranking logic 224, control logic 232, and communication logic 234 is depicted as part of recommendation system 12, these logical components need not be so configured, and in other embodiments, other configurations of the various components, within recommendation system 12 or distributed over one or more computing systems, are possible. Retrieval logic 222, ranking logic 224, control logic 232, and communication logic 234 may be variously implemented in software, hardware, firmware or any combination thereof. In the exemplary recommendation system 12 shown in FIG. 2, retrieval logic 222, ranking logic 224, control logic 232, and communication logic 234 are implemented in software and are stored in memory 210 of the recommendation system 12. Note that these components, when implemented in software, can be stored and transported on any non-transitory computer-readable medium for use by or in connection with an apparatus (e.g., a microprocessor) that can execute instructions. In the context of this disclosure, a "computer-readable medium" can be any device or system that can contain or store a computer program for use by or in connection with an instruction execution apparatus.

The logics of the exemplary recommendation system 12 depicted in FIG. 2 may be executed by one or more conventional processing elements 260, such as a central processing unit (CPU), digital signal processor, other specialized processor or combination of processors, or other circuitry that communicates to and drives the other elements within the recommendation system 12 via a local interface 265, which can include at least one bus. As an example, the processor 260 may execute instructions of software stored in memory 210, such as retrieval logic 222, ranking logic 224, control logic 232, and communication logic 234. While FIG. 2 illustrates one processor 260 which implements all of the various logics in the recommendation system 12, it is possible in other embodiments for the system 12 to employ multiple processors. In one such alternate embodiment, discrete processing elements may be used for each of (or any subset of) retrieval logic 222, ranking logic 224, control logic 232, and communication logic 234, or any portions of those logics. In some embodiments, the processing of system 12 is not limited to being performed by a processing element connected to the local interface 265, but instead, processing in support of the various logics of recommendation logic 220 may be distributed over one or more computer systems that may be remotely located. In some embodiments, the processor 260 may comprise an artificial neural network or other type of configuration for performing machine learning functions based on instructions stored in memory 210.

Memory 210 may be configured, in some embodiments, to include a user database 240 that stores information and metrics related to one or more users in relation to their profile and/or activity with the advertiser's systems. Memory 210 may also include an experience database 250 that stores information and metrics related to individual travel experiences. The user database 240 may be generally understood to contain information about one or more users' interactions with the web server 15, and the experience database 250 may be generally understood to contain information regarding one or more travel experiences that may be available to the users of the web server 15. The various described logics stored in memory 210 may read data from or write data to the user database 240 and the experience database 250 as part of their respective calculations.

The data stored in user database 240 is related to one or more customers or target customers of the advertiser. Here, "customer" or "user" may correspond to any person or entity that the advertiser wishes to target with a communication to encourage purchase of a product, even if no purchase is ultimately made. The data stored in database 240 may include information from the user's profile 242, such as, e.g., user ID, user account information (e.g., name, contact information, email address, mailing address, telephone number, date of birth, payment card information), demographic data about the user, such as age, gender, location, language, and device information, GPS or location data, operating system, browser, or other device data, user preferences, connected third party accounts (e.g., social networks) if applicable, and the like. In some embodiments, where the advertiser provides a platform for property rental, user database 240 may also include information about a user's current bookings (or purchases) 244 and/or information about past bookings (or purchases) of properties or of experiences 246, and/or any other appropriate type of information specific to or related to the user.

In some embodiments, user database 240 may also contain information 248 about a user's onsite activity at the service provider's website. Such data is not limited to activity on a website itself but may include any interaction with the service provider, such as use of the service provider's application, or engagement with the service provider over social media. Activity data 248 may indicate, for example, whether and when a user accessed the service provider's site, and what actions they took there, such as the user's searches or filters for specific property or experience characteristics, whether and how long a user views a property listing or an experience listing, whether the user views maps or searches within particular geographic regions, the frequency of user searches, a user's purchase/booking history (including, e.g., the past bookings, booking locations, booking costs, guest information, and the like), search history, saved items, liked/disliked items, views, and/or how any of these factors relates to the user's history of purchases/bookings, among other things. In some embodiments, activity data 248 may include the set of property listings and/or experience listings presented to the user in response to a search on or visit to the service provider's website, use of the service provider's app, or through advertisement via a third party platform, and/or the user's interactions with those presented or advertised listings.

In an exemplary embodiment, memory 210 also stores experience database 250 containing information identifying and/or related or unique to a number of travel experience listings stored with the service provider. Each experience may correspond to a listing that can be presented to the user, via user interface 25, so as to provide information about the experience. This information is collected from experience profile data 252 and may include such data as the location of the experience, a description of the experience, contact information for the experience (e.g., phone number or website), user reviews or ratings, date/hours or other availability information, booking information (e.g., allowing the user to making a reservation or booking), directions, and/or other appropriate information. Experience database 250 may also store information about user reviews or ratings, which may be a text or character-based review, a numerical value, a star count or similar tiered rating, a set of one or more tags or superlatives assigned to the experience, or any other known rating/review system. Such rating/review information may be stored in experience database 250, for example by storing, association with each other, a unique experience listing (e.g., by a unique identifier, such as an experience ID, an experience name, a location address or location identifier or the like), the review/rating(s), information sufficient to identify the user(s) who left the rating or review, and/or an indication of whether the user booked the experience, or any subset thereof.

In an exemplary embodiment, one or more data structures may be stored in the memory 210 to facilitate search against the experience database 250. Such data structures may include, for example, a search inverted index that creates, for each experience stored in database 250, a mapping from the properties and/or attributes associated with an experience (which may include ratings) to a unique ID associated with the experience. Memory 210 may additionally or alternately include a data structure that facilitates the converse search, that is, an experience forward index that creates, for each experience stored in database 250, a mapping from the unique ID associated with an experience to the properties and/or attributes associated with the experience.

In an exemplary embodiment, the recommendation logic 220 may also access third-party data from one or more external databases 270 via communication logic 234 and the communication interface 13. Communication logic 234 may use APIs provided by those third-party entities managing the databases 270 to obtain their respectively stored data, however, other methods of data collection may alternatively be used such as one or more software development kits, which may include, e.g., one or more application programming interfaces (APIs), web APIs, tools to communicate with embedded systems, or any other appropriate implementation. In an exemplary embodiment, this information may include various information specific to the location in which the user intends to travel and/or the location of a proximate (or relatively proximate) travel experience. As shown in FIG. 2, this information may include any of map information 272 about the region surrounding the location in which the user intends to travel, traffic information 274 about that region, and/or weather information 276 about the travel destination region, and/or how the map, traffic, and/or weather information may relate to travel between the user's intended travel destination and a travel experience location proximate thereto. In an exemplary embodiment, such information is provided on a real-time basis in response to a query sent from the recommendation system 12.

The external databases 270 may also include local event information 278, which may identify, for example, local events that the user may wish to visit/travel to that are not otherwise listed as experiences, such as temporary events, installations, pop-ups, and other transient occurrences that may overlap with the user's intended period of travel. Local event information 278 may also include information on street or transportation closures or changes, or other data that may impact or relate to travel between the user's intended travel destination and a travel experience location proximate thereto.

In some embodiments, this externally-available data may also include information collected about the user who has submitted a query, such as, e.g., information collected from cookies, GPS or location data, device data (e.g., operating system or device make/model) or other data customarily made available by a customer's device(s), application(s), opt-in preferences, and/or user information publically shared with/over the third-party channel (such as social media activity via posts, images, comments, tags, etc.), and the like. In other embodiments, the external data 270 may include one or more of information indicating whether and when one or more advertisements (or communications) were delivered to the user and click/view/share data comprising a number and timing of user clicks/view/share made for a particular marketing communication on the marketing channel, the number of impressions of the advertisements on the user, the length of time for which the advertisement was displayed to the user and/or the ad was viewed, the position of the ad on the user's display, among other things. The data in the third-party databases may also, in some embodiments, include the user's activity on the third-party channel generally, such as the user's search history, among other things. It will be generally understood that while three external databases 270 are shown, any number of databases, whether local or remote to the recommendation system 12 may be used, in various configurations, in different embodiments.

In one embodiment, the communication logic 332 may be used to crawl the web or known databases for publicly-accessible third-party information. Publicly-accessible data may include, for instance, information about weather or traffic conditions, population density, business density, local business hours, business types, local ordinances, and the like. Similarly, third-party social media sites may provide similar information, as well as information about mobile, transient, or temporary experiences, events, street closures, and the like.

It will be noted that while the term "database" or "repository" is used with reference to systems 210, 240, 250, and 270, these components are not so limited nor is any particular form or configuration of data storage mandated, and the described "databases" may alternatively be an indexed table, a keyed mapping, or any other appropriate data structure. In an exemplary embodiment, user database 240, experience database 250, and system 12 as a whole are managed by the service provider so as to be connected to a local network, and databases(s) 270 are managed by third-parties so as to be accessible by a communication interface 13 through network 30; however, other configurations may be possible in other embodiments, as long as system 12 is able to access data from the databases 240, 250, and/or 270. The data stored in user database 240, experience database 250, and/or external database(s) 270 are variously used, as described below, to provide a ranked listing of travel experiences in response to a user query, among other things. The use of stored data in each of these functions is described in greater detail below.

As discussed above, in one exemplary embodiment, a user is a user of a service provider's website, where the service provider may be a travel-oriented service provider that facilitates the booking or reservation of travel. A user may visit a website or an app managed by the service provider and may enter a search query specifying a geographic location (such as a city or region) to which the user wishes to travel or in which the user is located and wishes to search. In some embodiments, the user may specify, through direct search or filtering of search results, additional criteria for the search query, such as dates of travel/stay, a number of guests, a desired price (or price range), desired features of the listing, and the like. Based on this query, the recommendation system 12 may display to the user, on their user device 16, a list or set of listings which may include reservable properties matching the user's query. In one exemplary embodiment, the user's search is directed to finding an area property listing and the service provider provides in response, in addition to a set of property listings matching the search, a set of travel experience listings that may be relevant to the query based on the location specified in the query, filters entered by the user, and other user and area characteristics. In another exemplary embodiment, instead of searching for area property listings, the user's search is directed to travel experiences in a particular geographic area, and may include one or more of the same filters specified above. In response to the user's query, the recommendation system 12 may display to the user, on their user device 16, the set of travel experience listings that may be relevant to the query without displaying property listings.

The identification of travel experience listings that may be relevant to the user's query is performed by the recommendation logic 220. In an exemplary embodiment, this is done as a two-stage process. Initially, the retrieval logic 222 obtains a list of experiences, stored in the experience database 250. Next, the ranking logic 224 determines a ranking order in which to display the retrieved set of experience listings to the user, on a display of the user device 16. Each of these logics will be discussed in turn with reference to FIGS. 3-6B.

Figure 3:
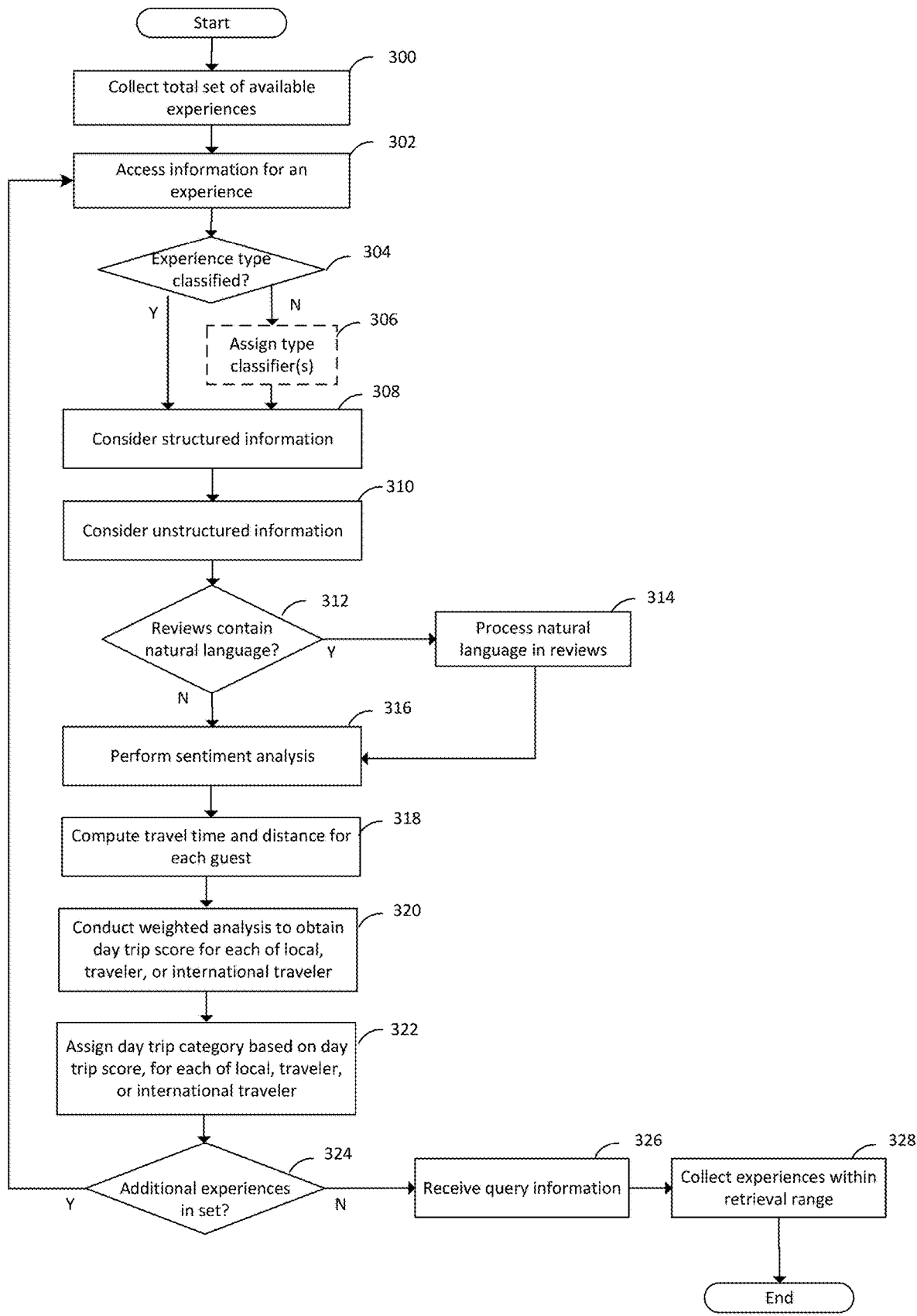
FIG. 3 is a flow chart illustrating a method of generating a list of travel experiences in response to a user query in accordance with some embodiments of the present disclosure.

FIG. 3 is a flow chart depicting an exemplary process by which a set of experiences is retrieved in correspondence to a user query, in accordance with some embodiments. The illustrated processes, performed by retrieval logic 222, first collect a set of all available experiences. For each experience, retrieval logic 222 then determines a score indicating a quality, value, and/or uniqueness of a travel experience. More particularly, in the manner described below, the retrieval logic 222, in advance of receiving a query, applies a weighted analysis of multiple factors, to calculate a "day trip score" for each unique travel experience stored in the experience database 250. This score may then be used to assign the experience to a particular categorization or grouping. The categorized experiences are later considered by the retrieval logic 222, in combination with a user query, to determine whether or not to include a particular experience in the retrieved search results. In an exemplary embodiment, the day trip categorization of an experience may be performed at predetermined intervals (such as daily, hourly, or in real-time as appropriate) and/or may be performed offline using information stored internal to the service provider's network, so as more efficiently use computing resources, however, other embodiments may differ such that the functions of the retrieval logic 222 or any subset thereof are performed online and/or in real time (or near real-time), particular in implementations that are not resource-constrained.

A day trip may be understood as an experience that a user may be interested in reserving, booking, attending, or visiting while the user is in the location specified by the query. In some embodiments, an experience may be more suited to be a day trip if the user can travel to, experience, and return from the experience within a period of time that fits within the user's planned period of travel. The particular length of the time needed for the experience, including travel, need not be a single day (though in some cases may be), and instead may be generally understood as a trip of a length that can fit comfortably within the length of the user's stay in or near the geographic area specified by the query. Therefore, if a user is within an area for, e.g., one week, a day trip may in one embodiment be a trip that can be travelled to, experienced, and travelled from within a period of less than one week. In another embodiment, a day trip may be limited to an experience that can be visited within a certain percentage of time of the total length of the user's stay, or may be capped to a certain number of days. The particular length of a day trip may vary, and indeed, the length of the trip and the length of the user's stay may be considered. Accordingly, in an exemplary embodiment, retrieval logic 222 determines in response to a user query for experiences, for each potential experience, whether an experience is suited to being a day trip for the user.

In an exemplary embodiment, retrieval logic 222 begins, in step 300, by collecting a total set of experiences available to the user who has submitted the query, which set typically includes all of the unique experiences within the experience database 250. However, embodiments may exist where only a subset of experiences in the database 250 is considered, for example, excluding experiences that are outdated, out of season, sold out, or otherwise unavailable to the user.

This retrieval is guided by computations performed in advance of the receipt of the user's query, and the results of the computations are stored in association with experience listings in experience database 250. In its initial collection of a total set of experiences, retrieval logic 222 may perform one or more searches against information stored in the experience database 250. For instance, in an exemplary embodiment, retrieval logic 222 may use a search inverted index that sets out, for each experience stored in database 250, a mapping from the properties and/or attributes associated with an experience to a unique ID associated with the experience.

In step 302, the retrieval logic 222 may access information related to one experience of the total set of experiences. The retrieval logic 222 considers this single experience (and information associated therewith) in the processes described in steps 302-322, and repeats such processes for each of the experiences stored in database 250.

In step 304, retrieval logic 222 may consider whether an experience type classifier has been assigned to an experience. During creation of a listing associated with a travel experience (or, in some embodiments, after creation), the creator (e.g., the owner/merchant offering the experience or the service provider) may assign to the experience one or more broad category or type definitions, that is, one or more general classifiers or areas of interest into which the experience falls. Such type classifiers might include sports, outdoors/nature, food/drink, leisure, entertainment, sightseeing, family, or any other appropriate category. In an exemplary embodiment, the type classification is done manually by the creator of the experience listing, however, in other embodiments, the classification may be done in an automated matter, for example by analysis of the description of the experience listing, the location of the experience, the creator of the experience, and/or any other appropriate factors. While these exemplary experience type classifiers are defined broadly, other embodiments may have more narrow or granular classification, depending on factors particular to the geographic region. For purposes of illustration, if a user searches for experiences in the San Francisco region, he may be interested in wine tasting experiences separate from restaurant experiences. Accordingly, in that particular market, a more granular classification breakdown of "food/drink" may be beneficial. Similarly, areas known for winter sports may wish to have a more specific classification of different sports experiences. Of course, many other examples are possible in different embodiments.

If an experience has been assigned one or more type classifiers, the process may consider such classification in Step 308. If it has not been categorized, some embodiments may involve the assignment of one of more classifiers in step 306, based on the information in experience database 250. Step 306 is illustrated in FIG. 3 with a broken line, as such step is not strictly necessary. In some embodiments, rather than assign a category, retrieval logic 222 may instead simply ignore classification information with relation to unclassified experiences.

In step 308, the retrieval logic 222 considers structured information obtained from the experience listing in the experience database. Structured information may include information entered through a structured input, that is, data that follows one or more organizational and/or formatting standards (for instance, so as to be searchable within a relational database). Some examples of structured data associated with an experience may include, e.g., a number of reviews, a total review score, the category into which the experience falls (or other tags associated with the experience), an indication that the experience is unique (e.g., contains unique descriptors and/or unique type classifiers), indications that the experience is better than expected, any information that may be collected from, for example, quantitative or selection-based guest surveys, and the like. In addition, some structured information may be gathered from input from the creators of the experience, such as vetting scores or knowledge graph tags.

The retrieval logic may also consider unstructured information associated with a travel experience in step 310. In the embodiment of FIG. 3, such unstructured information may include a set of user reviews. While a starred or numerical user rating may be structural in nature, Step 312 may consider reviews (or other text or character-based content) that are made of characters, narratives, natural language, or other types of content without a standard format. In a case that step 312 determines that there is natural language in the reviews, the retrieval logic 222 may in step 314 use, in different embodiments, statistical methods based on one or more of machine translation, sentence diagramming, human-computer interactive solutions, or any known techniques, algorithms, tools, or resources for natural language processing.

The information in these reviews is used, in Step 316, in a sentiment analysis, to determine a general tone or character of the reviews. For instance, in Step 316, the sentiment analysis may provide information from which the retrieval logic 222 may determine whether a review of the experience is positive or negative, whether there were any particular features of the experience that were liked or disliked, whether the guest would recommend the experience, whether the guest believes the experience was worth the drive/travel time, and/or any superlative or descriptive terms that may be relevant. While FIG. 3 focuses on guest reviews of an experience, in general, any information stored in experience database 250 that follows no particular format or organization may be considered as unstructured data in the sentiment analysis.

In step 318, the retrieval logic calculates a travel time and distance to the experience for each guest that has booked and/or reviewed or rated the experience. In an exemplary embodiment, this calculation is based on location information obtained from the guest's user information stored in user database 240. In an embodiment where the guest booked a property for his stay at the time he visited the experience, the travel time and distance may be calculated from the location of the booked property to the location of the experience, or may be calculated as a round trip value therefrom. In other embodiments, different locations may be used, in the same manner as is described above and below with relation to determining the query location for the experience retrieval.

This calculation of travel time need not be based solely on distance or distances and rather, in some embodiments, the calculation may additionally consider factors such as the day/time/season of travel, traffic, road conditions, weather, popularity of experience, anticipated weight times, and the like. The information used in such analysis may be obtained, for example, from one or more of external databases 270, and particularly, map information 272, traffic information 274, weather information 276, and/or local event information 278, though any additional information may also be considered in different embodiments so as to accurately predict travel time. In an alternate embodiment, rather than performing a travel time calculation itself, the retrieval logic 222 may obtain a travel time calculation from an external source such as a third party map or directional resource (e.g., via one or more APIs).

The determination of travel time may also include a period of time (or a predicted period of time) during which the guest visited the experience. Such prediction may be based on, for example, information collected from the guests' reviews 254 stored in database 250. In addition, some embodiments may involve a comparison of each guest's experience to an average or aggregated guest experience. As just one example, the time that a particular guest spent at the experience may be compared to an average time, to determine, e.g., whether the guest left quickly or stayed for an extended time. Of course, many different comparative determinations may be made from the collected information.

As illustrated, retrieval logic 222 may, in step 320, perform a weighted analysis of the structured information, the unstructured information, and/or the travel time and distance calculation to obtain a scored value for the travel experience. This weighted analysis may be performed for each experience in experience database 250, or a subset thereof. Additionally, the analysis may be performed with regard to each of one or more types of users who have booked, reserved, visited, reviewed, and/or rated an experience. In an exemplary embodiment, users may be distinguished by being either local (that is, searching for experiences in their home location) or a traveler to the location (that is, having travelled to stay in the geographic location for a limited amount of time). Travelers to the location may also in some embodiments be subdivided as domestic or international travelers (or otherwise subdivided to indicate degrees of travel distance or travel complexity, for instance, subdividing by a range of distance travelled, whether travel was done by land or air, whether a visa was required, estimated flight cost, or any other appropriate value). More particularly, a user's point of origin with respect to the location (whether local or travelling) may have significant impact on the determination of whether the experience is a good day trip, that is, one that can be in practicality completed within the span of the user's stay, and also considering, e.g., whether it is one that the user may already be familiar with (i.e., a local may be less interested in a sightseeing experience), whether the user may have additional or frequent opportunities to visit the area, and the like. The determination of whether a user is a local or a traveler (or any subdivision) may be performed based on the booking history of the guest. In addition, in some embodiments, the determination of whether a user is a local or a traveler (or any subdivision) may be performed in Steps 308-316 regarding each of the guests who have left reviews or ratings for the experience. In some embodiments, therefore, the sentiment analysis of Step 316 may be separately determined for each of local and remote users, though other embodiments may not necessarily perform such divided analysis.

Additionally significant to the analysis is the travel time and/or distance computed in the manner described above. Put simply, because a user's time is limited (such limitation being dependent on certain conditionals, for example whether the user is staying temporarily or is local), he may be unwilling to travel for a long time to visit an unpopular or mediocre experience. The calculation of step 320 may then, in a case where the travel time is relatively high, more heavily weight or score experience entries for which the user reviews were generally positive. A less popular or less positively-viewed event, even if within a shorter or smaller distance, may be ranked less highly. By these means, in the weighted analysis, the retrieval logic 222 may consider whether the experience is "worth" traveling to.

In an exemplary embodiment, the weighted analysis conducted in step 320 may include a fusion or aggregation of the collected information to obtain one or more signal values used in a calculation of a day trip score. A day trip score may be generally understood as a numeric value indicative of whether or not, and to what degree, an experience is well-received or highly rated, particularly worth visiting, or booked by users. Additionally, characteristics of those guests that previously booked the experience (such as a user type, e.g., local or visitor) may be determined. These attributes of the experience and/or characteristics of the guests may be used, in the processes described in greater detail below, to find commonalities with the user performing that query and/or time-based and geographic bounds defined by the user query (or other user information).

In an exemplary embodiment, the weighted analysis of step 320 includes considerations of one or more of the structured experience information (collected in step 308), the experience type classifier (step 304), unstructured information (step 310), the result(s) of any sentiment analysis (step 314), the locality of the guests who booked the experience (step 316), the travel time and/or distance of those guests (step 318), interactions or relationships between the aforementioned information, or any other appropriate value, each of which may be considered as a "signal" that may impact the day trip score. In one embodiment, a signal value corresponding to an average or aggregated value representing one of the factors above. That is, in one embodiment, the retrieval logic 222 may obtain, with regard to a travel experience, signals including, e.g., an average review rating, an average sentiment score (a numerical value), an average travel distance of a guest, an average trip length of a guest, a day trip ratio (e.g., a comparison of an amount of time taken by the experience compared to the length of trip), etc. Other embodiments may not be based on averages, but may instead use signals based on any combination of median values, randomly selected values, most-commonly-occurring values, or any computation or determination based on an aggregated set of information about the experience that would provide a numeric input to insert into a weighted analysis.

Each signal is respectively or uniquely weighted so as to impact a calculated day trip score to different degrees of relevance. In the exemplary embodiment, weights for different signals may be tuned by the retrieval logic, and the weighted values linearly combined. In one embodiment, retrieval logic 222 may use the following exemplary equation to calculate the day trip score D for a particular experience i:

$$D = \sum_{i=1}^{n}(w_i * x_i) \qquad \text{(Equation 1)}$$

where each value $x_1$ through $x_n$ is a signal, and each value $w_1$ through $w_n$ is a weight respectively assigned to that signal. In an exemplary embodiment, the exemplary equation results in a numerical value representing the day trip score for the experience, though other formats or values may be used in different embodiments.

In an exemplary embodiment, retrieval logic 222 may apply one or more machine learning algorithms to identify, in real time, a predictive set of one or more weights indicating which of the signals are more or less likely to impact the user's ability and/or likelihood of booking or visiting the experience within the duration of his stay in the area. In some embodiments, a linear regression model trains on historical relationships between users' bookings of an experience in relation to user rating score, user review sentiment, number of reviews and/or level of detail in reviews, comparison of temporal conditions of the reviews of the experience (such as the time/season/date of review) to temporal conditions at the time of the analysis of retrieval logic 222, characteristics of the user (such as their locality and set preferences) in comparison to characteristics of the users who provided reviews of the experience, and/or other relevant historical data.

In other embodiment, retrieval logic 222 may tune the signal weights in accordance with another type of supervised regression or classification algorithm. In one embodiment, it may be trained on a set of data comprising all available experiences. In other embodiments, the algorithm(s) may be trained on a set of data limited to a geographic area or region, though other boundaries of the training set, such as travel distance, travel time, or city/state/country borders may be used in different embodiments.

Different embodiments are contemplated that are not limited to linear analysis. In one embodiment, a weighted analysis of step 320 may be performed as a supervised regression or classification task using a gradient boosted decision tree (GBDT) model, involving the iterative construction of decision trees with different weightings of the defined signals. In this iterative manner, the weights may be adjusted to minimize a difference between the predicted value and the actual value of the day trip score. In another embodiment, a weighted analysis of step 320 may be performed as a non-linear supervised regression or classification task using a neural network.

In still other embodiments, retrieval logic 222 may assign any of weights $w_1$ through $w_n$ through a manual determination by the service provider, a deterministic formula, or any other appropriate method. Alternate embodiments may include any combination of the above-mentioned learning or deterministic algorithms, or any other known algorithm.

In some embodiments, the historic actions of the user that submitted the query may be used in the weighted analysis. That is, for each user having a profile with the service provider (or in some embodiments, for users whose historical data or session data may be cached and aggregated, e.g., by storing an identifying cookie value), the user's historical actions may be stored. One example of such an implementation considers the relationship of a user's viewing and booking of an experience. If a user clicks on the user interface (e.g., an app or website) to view an experience (or otherwise views the experience, for example when the experience is presented through a targeted communication or advertisement) but the user does not reserve or book the experience in response to the viewing, the user's actions may act as a signal that is weighted negatively against the day trip score. Similarly, if they view the experience and do make a reservation or booking, such signal may weigh positively towards the score. That is, an indication of the user's interest or disinterest may weigh positively or negatively against the score.

A day trip score is calculated, in the exemplary embodiment, for each defined user locality type, for example, local users, travelers, foreign travelers, or any other appropriate indicator of a user's distance from the general location of the experience and/or length of stay. In an embodiment where this distinction is limited to local users and travelers, two different day trip scores are calculated, one directed to a local user, and one directed to a traveler. In some embodiments, travelers coming to the location from a certain distance (e.g., within a country or from within a predetermined distance in kilometers) may be distinguished from travelers coming to the location from a larger distance (or, e.g., from a different country, region, etc.). In such an example, three categorizations of user would exist: local user, short-distance traveler (e.g., domestic traveler), and long-distance travelers (e.g., foreign traveler). Each of these categories would be associated with a different day trip score, therefore the retrieval logic 222 would calculate three different scores. Other embodiments may include additional granularities of distinction, for example, further dividing or subdividing local users or travelers into any appropriate number of categories.

In other embodiments, additional categorical distinctions between users may apply, for example, grouping types of travelers as business travelers or vacation traveler, extended stay travelers (e.g., those staying for weeks, or months at a time) or short-term travelers (those staying hours or a relatively small amount of days), or any other appropriate distinctions. For each of the defined categories of user, different weightings may be applied, so as to emphasize or de-emphasize different signals that may be more or less relevant to the particular category of user. By these means, a different day trip score may be obtained, per experience, for each of different categories of users. In some embodiments, each of these day trip scores may be stored, in relation to the associated experience, in experience database 250.

In step 322, retrieval logic 222 categorizes the calculated day trip scores, for each experience, placing the scores in one of several groupings or buckets, referred to herein as "day trip buckets." More particularly, one or more buckets may be respectively assigned a range of numerical value, and the experiences of the total set of experiences are sorted into buckets based on their numerical day trip score. In an exemplary embodiment, three buckets are used, specifying high, medium, and low levels of appropriateness for a day trip. In some embodiment, a "low" scoring experience (that is, within the lowest day trip score range) may be placed in a "DAY TRIP" bucket, a "medium" scoring experience may be placed in a "POPULAR DAY TRIP" bucket, and a "high" scoring experience may be placed in a "STAR DAY TRIP" bucket, though of course, any appropriate title or distinguishing classification may be alternately used. Further, any number of buckets may be used in other embodiments, for example in consideration of performance or latency issues.

The categorization of experiences is used, in steps 326-328, to determine the set of experiences within the retrieval range of a particular query received from a user. This retrieval range will ultimately be output by the retrieval logic 222 for ranking (by the ranking logic 224) and display of travel experiences to the user in response to the query. Steps 326 and 328 are, in an exemplary embodiment, performed in real-time in association with a networked connection, however, other embodiments may differ such that the grouping functions of step 322 are performed offline or at predetermined intervals.

Retrieval logic 222 may, in an exemplary embodiment, conduct a search retrieval using a query string entered by a user into a search field. In an exemplary embodiment, the query input by the user via user interface 25 and used by the retrieval logic 222 includes a value that specifies a geographic location in which (or near which) the retrieval logic 222 will obtain travel experiences. The location information obtained through the query may be broad or high level, for example a city, state, or region, or may be more granular, for example a specific address, a building, an intersection, a neighborhood, or any other appropriate area. The location specified through the query will be used as a center point from which the retrieval of experiences within a retrieval range is performed.

The query string may be a character string or identifying value (e.g., an address, building/area name, or coordinates) entered by a user into a text field, a sensed touch point on a map, or an interactive field for user input (e.g., drop down lists, radio buttons, predictive text, sliders, point/click, etc.). In other embodiments, a query value may be obtained based on a location stored in the user database 240, e.g., an address associated with a user (user profile 242) or a location of a user's previously-made, upcoming booking (current booking 244) or bookings made by the user for past days (past bookings 246). Other embodiments may use location information of a user's previous searches or views, for example based on a user's search history stored in a cache, and/or obtained from the activity data 248 stored in user database 240 or from third-party search information obtained from an external database 270. For instance, where a user has been repeatedly searching the service provider's website for property or experience listings in San Francisco (or any other region) or has viewed listings in that area, the retrieval logic 222 may use, as a search location, the same city specified in the user's previous searches/views.

In still other embodiments, in which no booking has yet been made (i.e., the user is simply searching in advance of a booking), the retrieval logic 222 may determine the actual location of the user device 16 from location information transmitted from the user device 16 via communication interface 13. In some embodiments, the location information may be obtained based on the IP address(es) associated with the user device 16. This may be used, for instance, in a case that the user is searching for a geographic location close to his current location (for example, where the user is local to the area, or has already traveled to their destination location). In some embodiments, a user device 16 such as a mobile device may also have a detectable location, such location being knowable or calculable through the entry of customer data and/or the transmission of a location-determination component located in a customer device, such as via GPS receiver or another similarly-functioning component, and the location of the user device 16 may be used as the location information. The location of the user device 16 may be additionally or alternately be determined using satellites, telecommunication towers, manual or map-based identification by a user of the device, or any similarly-functional techniques. In some embodiments, the location of the user device 16 may be requested by and transmitted to the web server 15. In some embodiments, transmission by the user device 16 may be triggered by the user's use of, e.g., an application or location-based component on the device 16 (such as logging into or opening an app), though other methods of transmission are possible in other embodiments.

In other embodiments, the user may enter a query value that may not be a location, but instead may be a character string indicating a name of an experience, a category of experience, a feature of the experience, or the like. In such a case, the retrieval logic 222 may, in some embodiments, limit or filter the retrieved experiences based on location information knowable from the user device 16.

In addition to the query string, the user may enter a set of structured information. Such information may, in some embodiments, correspond to one of more search filters shown on user interface 25. Such information may include for example, a date range of travel/stay, a number of guests, a price range, and/or additional location information, among other things.

At step 326, the user query information, entered through the user interface 25, is sent to the retrieval logic 222 via communication interface 13. Retrieval logic 222 uses the information specified in the query, most particularly the location specified by the query, to retrieve or collect a set of experiences in response to the query. In one exemplary embodiment, in step 328, the retrieval logic 222, includes, in the retrieved set of experiences, the following experiences:

1) all experiences within a boundary defined by query location (that is, the query city, state, region, area, or neighborhood as appropriate),
2) all experiences categorized in the DAY TRIP bucket that are located within a boundary defined by: query city boundary+X km,
3) all experiences categorized in the POPULAR DAY TRIP bucket that are located within a boundary defined by: query city boundary+Y km, and
4) all experiences categorized in the STAR DAY TRIP bucket that are located within a boundary defined by: query city boundary+Z km.

where X is less than Y, and Y is less than Z.
(Equation 2)

X, Y, and Z are shown in Equation 2 above as distance values measured in km or any other appropriate unit of measure, but in alternate embodiments may be measurements of time The values of distances X, Y, and Z may be determined by a regression or classification algorithm, a deterministic algorithm, predetermined distance values, or any appropriate model or algorithm to determine appropriate distances given any of the query location, the date/time/length of travel and/or of the user's availability for travel, seasonality, road conditions, and the like. Of course, this is just one example of how the retrieved set may be calculated, and other embodiments need not include three buckets/groupings of threshold distances, or these particular buckets, and may instead include any number of alternate or additional classification buckets and/or threshold values corresponding to the buckets.

The particular scores used in the exemplary embodiment correspond to the type of traveler that the user is determined to be. The user type is determined in a manner similar to that described above with respect to step 320, that is, a user may be grouped into a defined user locality type, for example, local users, domestic travelers, foreign travelers, or any other appropriate indicator of a user's distance from the general location of the experience and/or his length of stay. Other types or numbers of groupings may be used in other embodiments.

In an exemplary embodiment, all local experiences within a city boundary (or another geographic area) are collected for inclusion in a set of experiences within a retrieval range. Additionally, subsets of experiences at increasing thresholds of distance from the city are also collected, where each threshold distance is associated with an increasingly high requirement for day trip score (a different grouping or bucket). As one example, an experience classified as a STAR DAY TRIP would be retrieved even though it is relatively far away from the city, while a lower-scored experience, such as one classified as a DAY TRIP, would not be included if located at that same far distance. The lower-scored DAY TRIP experience would only be retrieved it was located closer to the city. In another embodiment, rather than use buckets or classifications, the numerical day trip score of the experience is used itself, such that experiences at different threshold distances are considered with relation to their day trip score to determine whether the experience should be included in the retrieved set of results.

In some embodiments, the distances are calculated as a number of kilometers (or other measurement of distance) from a central point, which may be an address, the center of a city, or another central value determined from the user's query (or from information about the user stored in the user database 240). Such distance may, in various embodiments, reflect a driving distance, non-driving travel distance (that is, by alternate methods such as walking, public transportation, biking, or the like), or a straight-line distance between the center point of the query location and location of the experience.

Figure 4A:
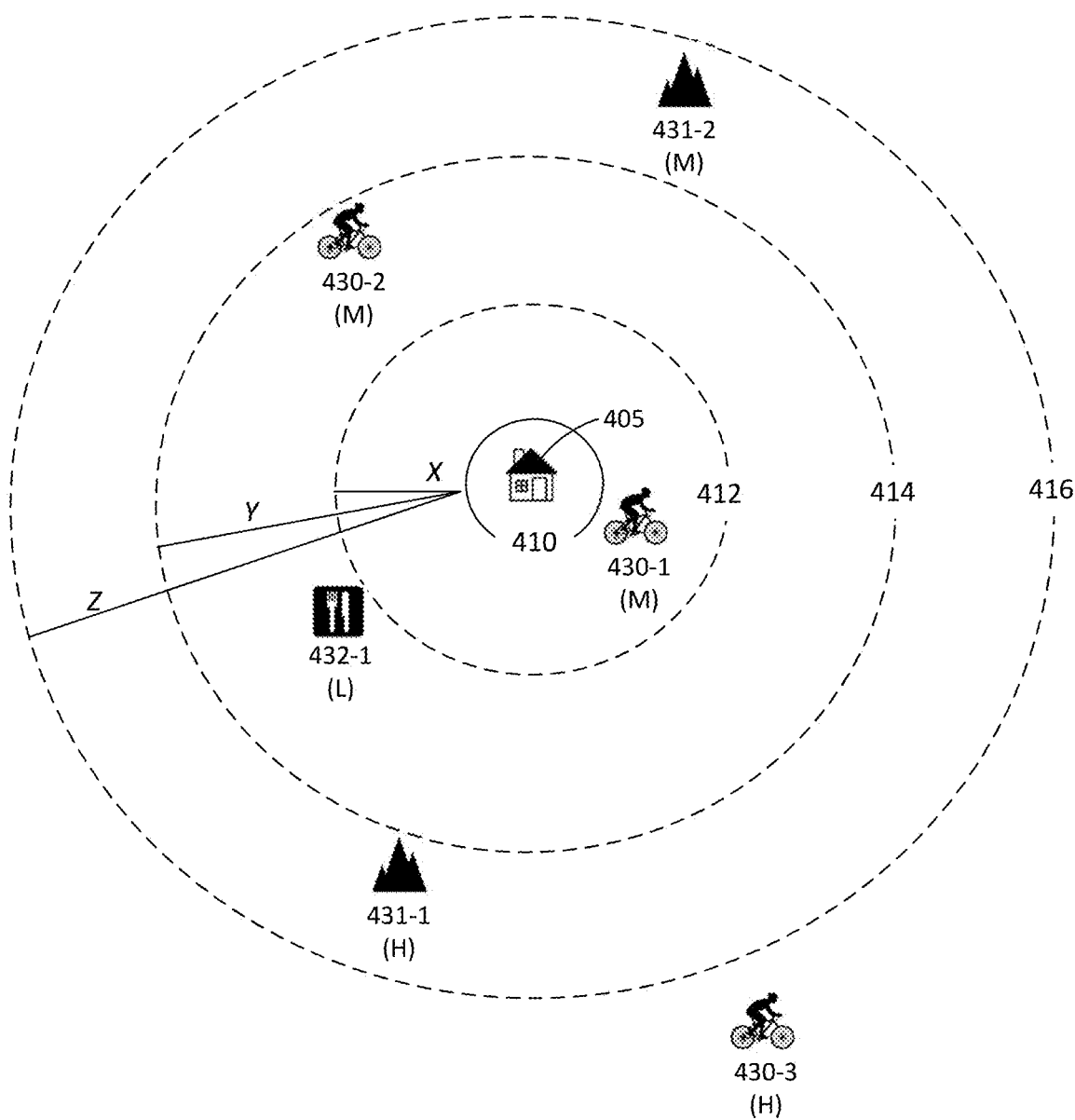
FIGS. 4A and 4B illustrate exemplary virtual areas used in generating a list of travel experiences in response to a user query in accordance with some embodiments of the present disclosure.
Figure 4B:
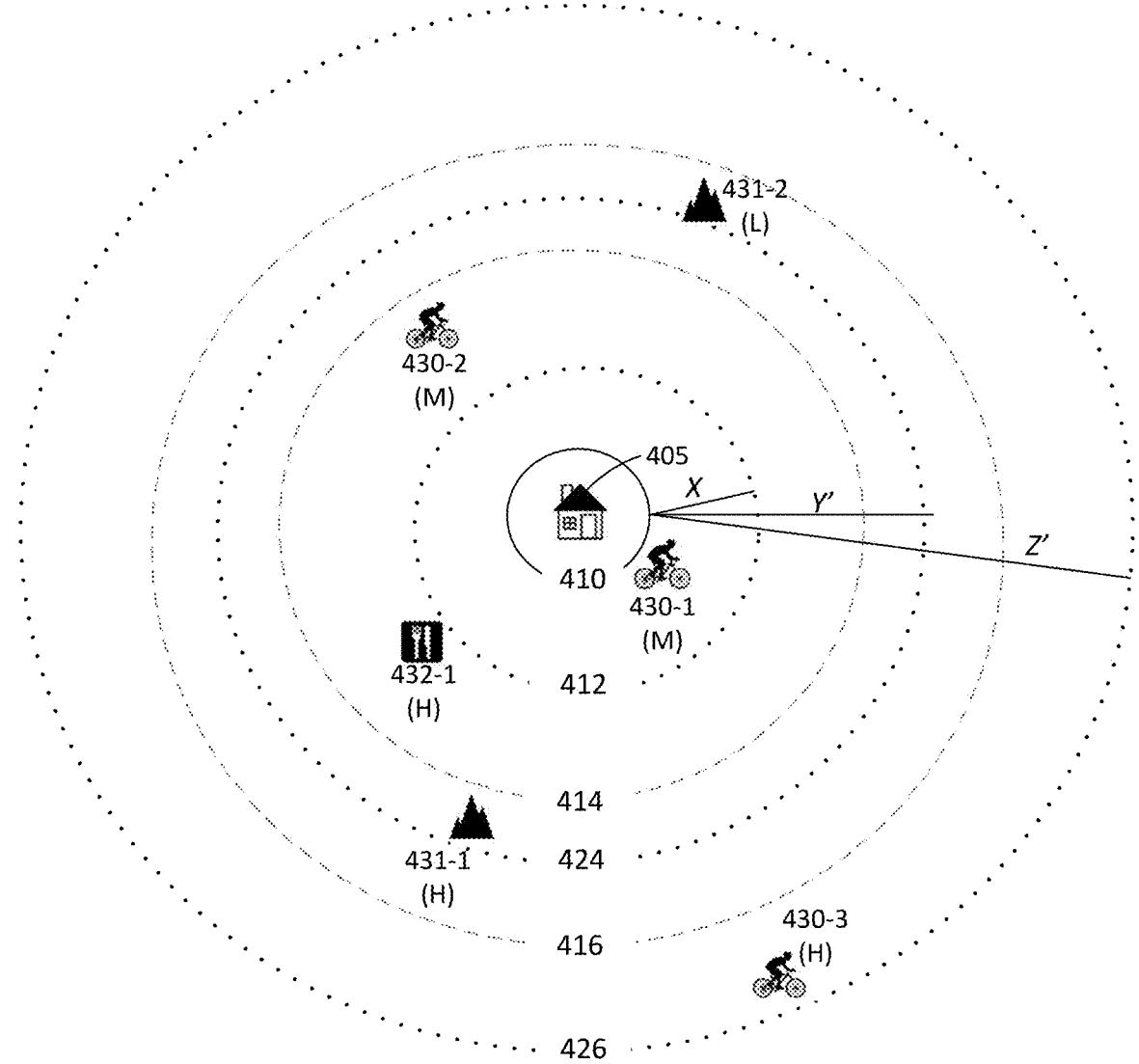

FIGS. 4A and 4B are diagrams of zones in which experiences may be retrieved by the retrieval logic 222 in response to a user query. FIG. 4A illustrates a scenario where a visitor, traveling from a domestic location, has booked a property (house) 405 within a city 410. City 410 (illustrated with a solid-line border indicating a city boundary or virtual boundary demarcating the city) is surrounded by three concentric circles 412, 414, and 416 (illustrated as dashed lines) of increasing size. Circles 412, 414, and 416 represent the boundaries of three virtual areas that are located at three threshold distances from the area within. Specifically, virtual boundary 412 is located at radius of X (e.g., in kilometers) from the city boundary 410. Virtual boundary 414 is located at radius of Y (e.g., in kilometers) from the city boundary 410. Virtual boundary 416 is located at radius of Z (e.g., in kilometers) from the city boundary 410. In the illustrated embodiment, X is a distance that is less than Y and Y is a distance that is less than Z, though the configuration of boundaries 412, 414, and 416 may differ in different embodiments. It will be understood of course the shapes and sizes of the exemplary regions enclosed by boundaries 410, 412, 414, and 416 used merely for purposes of illustration and none of the bounded regions need be of any particular shape or size. Additionally, other embodiments are not limited to three virtual boundaries, and any number of virtual boundaries may be used.

FIG. 4A depicts graphical representations of experience listings obtained from an experience database 250, along with day trip groupings from scores calculated for those experiences. The day trip groupings obtained in this embodiment are labelled as "H", "M", and "L". In the embodiment of FIG. 4A, an "L" rating is not intended to indicate that the experience is overall bad or unfavorably ranked, but rather, that the experience is ranked with a day trip score (which considers many factors, as described above with reference to FIG. 3) that falls within a lower bucket of day trip categorization. Similarly, "M" and "H" ratings respectively indicate medium and high buckets of classification, and do not correspond to an absolute indication of experience quality. These obtained ratings are specific to a type of the user that booked property 405, in this example, a domestic traveler visiting the city.

A single experience 430-1, a sports experience, is shown to be located outside the boundary 410 but within the boundary 412. Sports experience 410-1 is assigned a day trip rating of "M", indicating a medium-level rating. Two experiences, a sports experience 430-2 (with an "M" rating) and a dining experience 432-1 (with an "L" or low-level rating) are shown to be located outside of the boundary 412 but within the boundary 414. Two experiences, an outdoors experience 431-1 (with an "H" or high-level rating) and an outdoors experience 431-2 (with an "M" rating) are shown to be located outside of the boundary 414 but within the boundary 416. A sports experience 430-3 (with an "H" rating") is shown to be outside of the boundary 416. With respect to the embodiment of FIG. 4A, it may be assumed that experiences 430-1, 430-2, 430-3, 431-1, 431-2, and 432-1 are the entirety of the set of available experiences though other embodiments are not so limited.

Using an exemplary method, the retrieval logic 222 may determine a set of experiences within a retrieval range responsive to a query for experiences from the visitor. For example, using the location 405 (the address of which is known from the visitor's booking information in user database 240) and exemplary Equation 2 set forth above, the retrieval logic 222 includes in the set of retrieved experiences all experiences meeting the following criteria: (1) all experiences within a boundary defined by the city 410, (2) all experiences rated "L" that are located within boundary 412, (3) all experiences rated "M" that are located within boundary 414, and (4) all experiences rated "H" that are located within boundary 416. In accordance with the illustrated embodiment of FIG. 4A, the set of retrieved results returned by the retrieval logic 222 includes, in correspondence with those numbered items, (1) none, (2) none, (3) experiences 430-1 and 430-2, and (4) experience 431-1. For purposes of explanation, had either of experience 432-1 or 431-2 been given a higher day trip rating, that experience would be included in the retrieved range of results.

FIG. 4B illustrates how the range of retrieval may change for a different classification of user. FIG. 4B illustrates an example scenario where a user who is local to the city 410 has booked a property 405. City 410 (shown bordered by a solid line) is illustrated as being surrounded by three concentric circles 412, 424, and 426 (illustrated as dotted lines). Circles 412, 424, and 426 represent the boundaries of three virtual areas that are located at threshold distances from the area within, which threshold distances are determined based on the type of user. For instance, in the example embodiment, because the user is local to the city 410, the retrieval logic 222 may assume that the user is willing to travel farther for good experiences than the traveler in FIG. 4A, because the local user is not bound by time constraints related to the end of a visit to the city. Therefore, boundaries 424 and 426 are farther removed from the city 410 than the boundaries 414 and 416 of FIG. 4A. Further, in FIG. 4B, the retrieval logic 222 may assume that the user, despite being local to the city, may not be more or less interested in "L" rated experiences than a visitor, and therefore, retrieval logic 222 may leave the boundary 412 unchanged from that of a visitor shown in FIG. 4A, that is, boundary 412 remains at a radius of X from the city boundary 410. Virtual boundary 424 is located at radius of Y' (e.g., in kilometers) from the city boundary 410. Virtual boundary 426 is located at radius of Z' (e.g., in kilometers) from the city boundary 410. For purposes of comparison, the boundaries 414 and 416 shown in embodiment FIG. 4A are also illustrated in FIG. 4B.

As in FIG. 4A, the ratings of the experiences in FIG. 4B are calculated particularly for each of a specific type of user. In FIG. 4B, the user is a local resident rather than the domestic traveler of FIG. 4A. Accordingly, the ratings of the experiences shown in FIG. 4B differ from those in FIG. 4A, notably, dining experience 432-1 is given an "H" rating, and outdoors experience 431-2 is given an "L" rating. It may be assumed that experiences 430-1, 430-2, 430-3, 431-1, 431-2, and 432-1 are the entirety of the set of available experiences, though other embodiments are not so limited.

Using an exemplary method, the retrieval logic 222 may determine a set of experiences within a retrieval range response to a query for experiences from the local resident user. Using the location 405 (which address is known from the user's booking information in user database 240) and exemplary Equation 2 set forth above, the retrieval logic 222 includes in the set of retrieved experiences all experiences meeting the following criteria: (1) all experiences within a boundary defined by the city 410, (2) all experiences rated "L" that are located within boundary 412, (3) all experiences rated "M" that are located within boundary 424, and (4) all experiences rated "H" that are located within boundary 426. In accordance with the illustrated embodiment, the set of retrieved results returned by the retrieval logic 222 includes, in correspondence with those numbered items, (1) none, (2) none, (3) experiences 430-1, 430-2, 432-1, and 431-1, and (4) experience 430-3 (which now falls within the outermost virtual boundary 426). For purposes of explanation, had experience 431-2 been given an "H" rating, that experience would be included in the retrieved results.

Other embodiments may use, in generating the retrieved set of experiences, experiences that are not strictly bounded by distance but instead are bounded within a certain predetermined area (e.g., ending at geographical, political, virtual, or logical borders such as city, county, state, or country limits). For purposes of example, one such implementation might include: all experiences within the boundary of the query city, all experiences categorized in the "M" bucket (or POPULAR DAY TRIP bucket, or any other descriptive identifier) that are located within the boundary of the state that contains the query city, and all experiences categorized in the "H" bucket (or STAR DAY TRIP bucket, or any other descriptive identifier) that are located within the boundary of the country that contains the query city.

In other embodiments, the retrieved set of experiences may instead include experiences that may be travelled to within a various threshold periods of time (either by a certain travel method or regardless of travel method). As an example, such implementation might include, all experiences within the boundary of the query city, all experiences categorized in the "M" bucket (or POPULAR DAY TRIP bucket, or any other descriptive identifier) that may be travelled to, from the query city, within A hours, and all experiences categorized in the "H" bucket (or STAR DAY TRIP bucket, or any other descriptive identifier) that may be travelled to, from the query city, within B hours. Other embodiments are not limited to two categories or buckets, and may instead use any number of buckets and/or any number of threshold travel times.

Figure 5:
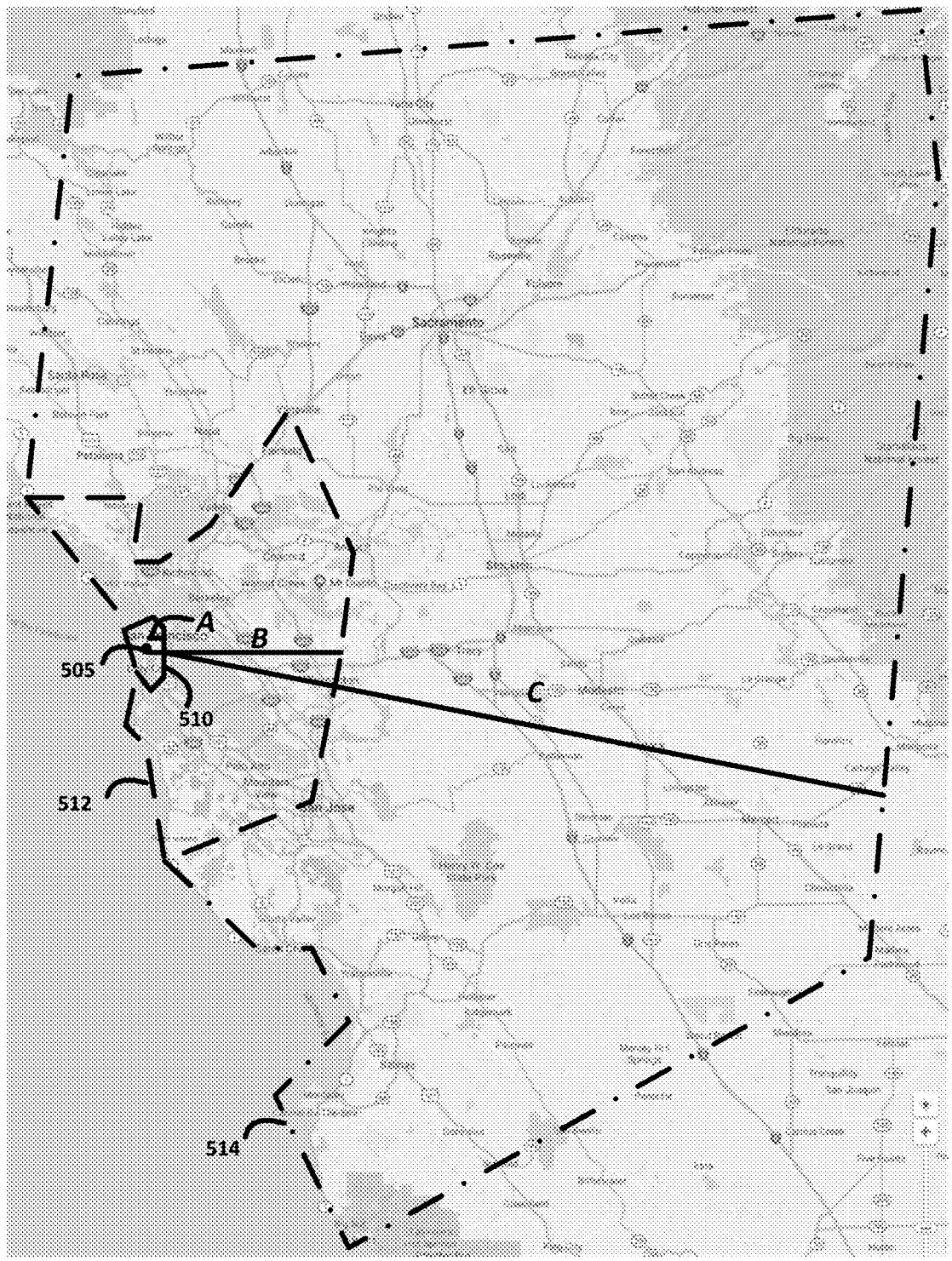
FIG. 5 illustrates a map of exemplary virtual areas used in generating a list of travel experiences in response to a user query in accordance with some embodiments of the present disclosure.

One such example is shown in FIG. 5, depicting a map with several virtual boundaries indicating threshold areas from a query city, each threshold area corresponding to a geographic area that can be reached from the query city within a certain amount time travelling by car. FIG. 5 illustrates a property at a location 505 in San Francisco that has been booked by a user. Location 505 is illustrated as being within three polygonal virtual boundaries, boundary 510 (illustrated with solid lines), boundary 512 (illustrated with dashed lines), and boundary 514 (illustrated with alternating dotted/dashed lines). Boundaries 510, 512, and 514 represent the boundaries of virtual areas that are located at increasingly greater threshold driving times from the location 505. More particularly, virtual boundary 510 encompasses all areas that are accessible to the user by car within a set threshold period of driving time A from the location 505 (e.g., 30 minutes). Virtual boundary 512 encompasses all areas that are accessible to the user by car within a set threshold period of driving time B from the location 505 (e.g., 120 minutes/2 hours). Virtual boundary 514 encompasses all areas that are accessible to the user by car within a set threshold period of driving time C from the location 505 (e.g., 240 minutes/4 hours). In the illustrated embodiment, A is a driving time less than B, and B is a driving time less than C, though the configuration of boundaries 510, 512, and 514 may differ in different embodiments. It will be understood of course that the shapes and sizes of the exemplary regions enclosed by boundaries 510, 512, and 514 are used merely for purposes of illustration and none of the bounded regions need be of any particular shape or size, nor are the embodiments limited to any particular number of virtual boundaries.

In still other embodiments, certain restrictions may be applied in the retrieval of the set of experiences, for example, to limit the experiences to those that permit the entire group of guests staying in the area with the user (as specified in the guest data of the user booking data 244), those are that suited toward the ages of the guests and/or the user. As just one example, certain experiences with age restrictions (such as, e.g., wine tasting experiences) may not be delivered to users below a required age. Other embodiments may exist where the user has specified conditions or restrictions in their user profile 242 (for instance scheduling information or passport or visa information), and such conditions or restrictions may be used to cull or filter available experiences.

Of course, it will be generally understand that the use of a broadly defined area, such as a city rather than a particular address or location, may impact the specificity of the ranked results, that is, the city may be geographically large, or complicated in traffic in infrastructure, and therefore, a center point from which the retrieval is performed may be an unknown distance from the actual location of the user or the location in which the user is actually intending to book a property.

The retrieved list of experiences generated by the retrieval logic 222 is, in an exemplary embodiment, a list of unordered results. Before delivery to a user, in response to their query, the retrieved results may be ranked by the ranking logic 224. This ranking decides the order in which the results will be presented to the user, for example on a screen of their user device 16, in response to their query.

Ranking logic 224 performs a ranking of a large number of retrieved experiences results, in view of information provided by the user, either through their query and/or through information obtained from memory 210 and one or more external databases. Ranking logic 224 may consider, for example, a type of day trip experience suitable for the user, based on, for example, the dates of user's stay in the query location, the quality of the experience, the user's previous bookings, the actions and/or sentiments of other guests who visited or booked the experience, and other appropriate factors.

Ranking logic 224 performs its ranking by calculating a user match score. In an exemplary embodiment, this user match score is a numeric value, although other types of values may be used in other embodiments. A user match score may be generally understood as a value indicative of how suited the experience is for travel within the boundaries or restrictions of the trip scheduled or contemplated by the user who performed the query. By way of example, a higher day trip score may reflect that an experience is more in line with the user's preferences, and/or is more likely to fall within certain time-based and geographic bounds defined by the user query (or other user information).

In an exemplary embodiment, the ranking logic 224 includes a weighted analysis of one or more personalization signals. A list of exemplary personalization signals follows, however, any appropriate personalization signal (or one or a subset of these listed signals) may be used, depending on the information stored in user database 240 and/or external databases 270. Ranking logic 224 need not use all of the personalization signals, and various embodiments may use any subset or all of the personalization signals, and/or other relevant personalization signals.

A first personalization signal may be a determination of whether a user is local, a domestic traveler, an international traveler, or any other appropriate indicator of a user's distance from the general location of the experience and/or length of stay. In some embodiments, groupings of users may be delineated by any number of groups indicating travel from a certain range of (e.g., within a country or from within a predetermined distance in kilometers), such as: local user, short-distance traveler (e.g., domestic traveler), and long-distance travelers (e.g., foreign traveler). Other embodiments may include additional or alternate granularities of distinction, for example, further dividing or subdividing local users or travelers into any appropriate number of categories. Information about the user's home location may be obtained, in some embodiments, from information stored in a user profile in database 240, or alternatively (e.g., if the user is not a member of the service provider's system or not logged in) may be calculated from a user's IP address, information collected from cookies, GPS or location data, device data (e.g., operating system or device make/model) or other data customarily made available by a user's device(s).

A second personalization signal may involve a determination of whether a user has booked or reserved a home in the area in which he has provided a query for experience results. In such a scenario, rather than a generic city location, the particular location of the booked home may be used to determine a distance from the location of an experience. Such distance calculation may be particularly useful in cases where the size, infrastructure, traffic, or other factors may add significant travel to traverse part of a city of region. As just one example, travel through a large city, such as Los Angeles, may add significant overhead to the driving distance to an experience. Therefore, the difference between the city center and an experience outside of the city may be significantly larger than the distance between a booked property location (located on city outskirts) to the experience.

A third personalization signal may involve a determination of the size of the party (e.g., the number of guests) who are included in the user's booking. For instance, a dinner experience may be less suited to a large group while an outdoor experience may be more suited. Similarly, the ranking logic 224 may consider the ages of the guests. The presence of young children may lead the ranking logic 224 to prefer family experiences, while older guests may lead to a preference toward nightlife experiences. Similarly, any indications of a type of traveler (e.g., a business traveler) may also be considered.

A fourth personalization signal may involve a determination of trip length. Such information may be obtained by the length of stay associated with a property booking (e.g., from current booking 244 in user database 240), or may be obtained, for example, from filters entered by the user in connection with a search query. Particularly, a longer stay may indicate a willingness to book an experience located farther away, while a shorter stay may indicate a disinclination to do so.

A fifth personalization signal may involve a determination of whether the user has visited the query location in the past. This may be determined, for example, based on the user's search history, activity on the service provider's app or website, past bookings, and the like (obtained from user database 240). For instance, where a user has made multiple visits to a queried location, the ranking logic 224 may be less likely to suggest a sightseeing experience or a common landmark experience, under an assumption that the user is already familiar with or has already seen such experiences.

A sixth personalization signal may involve a determination of whether the user has visited the experience in the past. This may be determined, for example, by a comparison of the user's unique ID in the user database 240 to the reviews or bookings for an experience stored in experience database 250.

A seventh personalization signal may involve a determination of what price the user, having made a current booking 244 or one or more past bookings 246, has paid with respect to a market price for a property rental. For instance, based on whether and to what degree a user has searched for or booked properties in a particular range of rates (or at rates comparatively lower or higher than market pricing), the ranking logic 224 may be more or less likely to recommend expensive and/or luxury experiences.

An eighth personalization signal may involve an analysis of a feedback loop created by the user's interaction with the service provider's app or website. For instance, where a user has clicked or viewed one or more times on a particular type of experience, location of experience, price of experience, or any other reflective consideration, the ranking logic 224 may be more inclined to recommend experiences in line with the user's clicks/views.

A ninth personalization signal may involve a determination of whether the experience is seasonally appropriate. For instance, the ranking logic 224 may be less inclined to recommend an out of season experience, or an experience that may be impossible or less reliable given the season, the weather, or any other relevant factor.

The applicability of any single personalization signal does not, in an exemplary embodiment, exclude or delete experiences from being included in the retrieved results, but it may lessen a weight applied to consideration of that signal. Each personalization signal is respectively or uniquely weighted so as to impact the ultimate user match score with different degrees of relevance. Ranking logic 224 may apply one or more machine learning algorithms, to identify, in real time, a predictive set of one or more weights. These weights indicate which of the personalization signals are more or less likely to impact the user's ability and/or likelihood of booking or visiting the experience within the duration of his stay in the area.

In one embodiment, ranking logic 224 may tune the personalization signal weights in accordance with a supervised regression or classification algorithm. In an exemplary embodiment, this task may use a gradient boosted decision tree (GBDT) model, involving the iterative construction of decision trees with different weightings of the defined signals. In this iterative manner, the weights may be adjusted to minimize a difference between the predicted value and the actual value of the user match score. In still other embodiments, ranking logic may assign weights through a linear regression model, as another supervised regression or classification task (e.g., via a neural network), another machine learning model, a manual determination by the service provider, a deterministic formula, any other appropriate method or any combination thereof.

In some embodiments, the historic actions of the user that submitted the query may be used in the weighted analysis. That is, for each user having a profile with the service provider (or in some embodiments, for users whose historical data may be cached and aggregated, e.g., by storing an identifying cookie value), the user's historical actions may be stored. One example of such an implementation considers the relationship of a user's viewing and booking of an experience. If a user clicks on the user interface (e.g., an app or website) to view an experience (or otherwise views the experience, for example when the experience is presented through a targeted communication or advertisement) but the user does not reserve or book the experience in response to the viewing, the user's actions may act a signal that is weighted negatively against the day trip score. Similarly, if they view the experience and do make a reservation of booking, such signal may weigh positively towards the score. That is, an indication of the user's interest or disinterest may weigh positively or negatively against the score.

FIGS. 6A and 6B depict example graphical user interfaces (GUIs) for displaying icons representing travel experience listings to a user, in accordance with some embodiments of the present disclosure. Turning first to FIG. 6A, GUI 600 represents information that might appear on a display screen of a user device 16 when using user interface 25. GUI 600 includes a header region 605 that specifies that the screen allows the user to "search for experiences." Header region 605 also includes a login indicator 610. As illustrated, login indicator 610 contains hyperlink operations for login/sign up, indicating that the user has not logged in or does not have a profile with a provider of the app/website displayed in GUI 600. Accordingly, it can be assumed that the information presented on the GUI 600 is not dependent on known information about the user, and that the information presented is more generic or standard to a guest to the app/website. In alternate embodiments (not specifically shown), even when the user is not logged in, the GUI 600 may use cached information or information from a web browser (e.g., saved cookies), mobile phone (e.g. operating system or version(s)), navigation component (e.g., GPS receiver), or any other value available from the user device 16 in order to customize the display shown on the GUI 600.

GUI 600 of FIG. 6A may also include a search field 620 and one or more options for filtering search results, shown in filter region 625. Search field 620 may be used by the user to input an address, geographic region, landmark, intersection, city, state, country, or any other geographic information that is relevant to an area in which the user wishes to search for experiences. In other embodiments, search field 620 may also be used to search for experience categories (e.g., sports, entertainment, food/drink, outdoors, etc.), experience name, or other characteristics which may be relevant to identifying area experiences. Filters 625 may be activated before or after the search is initiated, to further narrow search results and/or provide additional information. In the illustrated embodiment, the options for filtering include date/time (i.e., the dates in which the user will be in the area), a number of guests, a price (e.g., a maximum and/or minimum price or price range that the user is willing to pay for the experience), or a language, though other filters may be variously used in other embodiments.

The bottom section of GUI 600 is a search results field 630 which displays a number of icons to the user. Each of the icons represents a unique experience (associated with an experience profile in the experience database 250) that the user can select and/or book or reserve. In an exemplary embodiment, experiences are shown as a grid of images, where each image can be clicked or otherwise interacted with in order to access additional information about the experience and/or make a booking. Other embodiments may exist where search results are presented as text, video, images, or any combination thereof, as a list, map, or other graphical or textual representation, and the like. In an exemplary embodiment, regardless of the particular layout in which search results are displayed, the results are presented to the user in a recognizable order or ranking.

In the embodiment of FIG. 6A, a user has searched for "San Francisco, CA" in search field 620. Upon initiation of this search, the recommendation system 12 will recognize that this search query corresponds to the city of San Francisco, and will function to retrieve a set of experiences using a center point of San Francisco as the location around which to search for experiences. Retrieval logic 222 will access information categorizing all experiences as one of: high, medium, or low quality experiences. The retrieval logic will then retrieve all experiences that fall into at least one of the following categories: experiences within the boundaries of the city of San Francisco, lower scored experiences within a first distance (e.g., 10 km) from the boundaries of San Francisco, medium scored experiences within a second distance (e.g., 50 km) from the boundaries of San Francisco larger than the first distance, and higher scored experiences within a third distance (e.g., 100 km) from the boundaries of San Francisco larger than the first and second distances.

Ranking logic 224 will then rank those experiences according to one or more personalization signals. Because the user has not logged into the service provider's system (as indicated by field 610), only personalization signals non-specific to the user may be applied. In an exemplary embodiment, ranking logic 224 may apply a weighted ranking analysis of one or more of the following features: a determination of whether the user is local, a domestic traveler, or an international traveler (e.g., from the IP address of the user device), a trip date and/or trip length specified by a filter set in filter field 625, seasonality of the experience, if applicable, and/or a feedback loop based on user clicks where repeated user clicking on a specific type or category of activity indicates that the user may favor such activities (e.g., sports activities, group activities, family activities, outdoor activities, entertainment, etc.). Ranking logic 224 outputs an ordered (ranked) list of travel experiences. Icons associated with each of the experiences are displayed to the user in the ranked order in section 630. The first four ranked experience results are displayed in section 630 of FIG. 6A (of 500 results total as shown in field 635), in the following order: urban hike, bluegrass music, wine tasting, and beach yoga. Of course, the illustrated embodiment is merely for purposes of example, and any number of experiences, any type of experiences, and any method of ordering (e.g., in rows, columns, lists, maps, etc.) may be variously used in different embodiments.

The embodiment of FIG. 6B differs from that of FIG. 6A in that login field 640 of FIG. 6B indicates that a user has logged in and has a profile/account with a provider of the app/website displayed in GUI 600. Fields 620 and 625 function in relatively the same manner as those described above with regard to FIG. 6A. Additionally, the functions performed by retrieval logic 222 may be relatively similar in both embodiments.

However, FIG. 6B differs in the ranking of the retrieved experiences. In particular, because the user has logged into the service provider's system (as indicated by field 640), personalization signals that are specific to the user (including information associated with the user in user database 240) may be applied in the ranking algorithm. In an exemplary embodiment, ranking logic 224 may apply a weighted ranking analysis of one or more of the following features: a determination of whether the user is local, a domestic traveler, or an international traveler (e.g., from the profile information of the user device indicating a home location), a trip date and/or trip length specified by a filter set in filter field 625, seasonality of the experience, a feedback loop based on user clicks, user preferences specified in the user profile information 242 (such as a preferred category of experience, like sports or outdoors), whether the user has booked a home or hotel in the area (current booking data 244) and if so, the particular location and length of such booking, which location may be used as the center point of a distance calculation, information about other guest data associated with the booking (e.g., number of guests, type of guests, age of guests), the number of times that the user has booked homes in the area (indicating a frequency of travel), any indication of travel purpose (e.g., business), history of experience bookings and/or ratings. For instance, in a case where the user has booked a home and some of the guests for that booking are children, the ranking logic 224 may be more inclined to prioritize family or group experiences. Further, in a case where the user has been to the city of San Francisco several times before, the ranking logic 224 may be less inclined to prioritize sightseeing experiences, under the assumption that the user may have seen such sights. A user's purpose of travel may indicate a time of day in which he is available or unavailable. Still further, the length of stay, calculated through the length of the current property booking, may inform the ranking logic 224 as to how far the user is willing to travel; that is, a long stay may permit a longer time for an experience, while a shorter stay would limit the amount of time and/or distance that can be allocated to the experience. Additionally, ranking logic 224 may consider information about the user's previous home rentals, the price or location of which may provide guidance as to the type of experience the user may prefer.

Ranking logic 224 outputs an ordered (ranked) list of travel experiences, which list is displayed to the user as icons positioned in section 650 in the ranked order. In the example of FIG. 6B, the user may have, through booking history, user preference, and/or click/view history, indicated an interest or preference for sports and outdoor experiences. Accordingly, the ranking logic 224 may prioritize such experiences, showing, as the first four results in section 650, experiences for: urban hike, beach yoga, sailing, and surf lessons. It will be noted that in both of FIGS. 6A and 6B, the retrieval logic 222 outputs the same unordered set of experiences. In an exemplary embodiment, all of the experiences in that set are displayed to the user in both of FIGS. 6A and 6B, however, the order of ranking has changed, such that the topmost results shown in each respective image may differ. For instance, as shown in field 635 in FIG. 6A and field 655 in FIG. 6B, both results field 63 and results field 650 show the same number of total results (500). Other embodiments may be implemented where the results are filtered according to a known user preference.

By these means, a dynamically generated ranked set of travel experiences relevant a user query can be provided, indicative of travel distance or time, removing unsuitable candidates due to impracticality or difficulty of travel. Further, the solutions provided by the methods and systems described herein are scalable, requiring no manual curation. Due to this scalability, the systems described herein may analyze and recommend a greater number and complexity of travel experiences than could be handled by a human curator. Further, the calculation of relevance of an experience as a day trip or side visit to a traveler is dynamic, that is, it is performed by an automated analysis that calculates a variable, time-sensitive (viz., up to date) result based on reviews, previous bookings, seasonality, market price, current conditions, and many other factors. What is more, the systems take in a mixture of variously formatted and unformatted data regarding user's perceptions and reviews of experiences, transforming data to obtain standardized calculations of aggregated experience ratings. These ratings can be calculated in a manner specific to a particular customer or user segment. Still further, the systems and methods described herein further provide the ability to transmit, via a user interface, a list of ranked or ordered icons indicating travel experiences relevant to a user at various thresholds of locality, such ranking being based on stored or real-time location determination, locations of one or more experiences, dynamic analysis of sentiment and rating data for an experience, and a dynamic consideration of customer preferences and indications of interest.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A system for displaying rank-ordered query results, the system comprising:
   a memory configured to store a plurality of data in association with each of a plurality of travel destinations, wherein the plurality of data includes, for each destination of the plurality of travel destinations, first data regarding a quality of the destination, second data regarding a travel convenience of the destination, and a travel score, the travel score being based on the first data and the second data; and
   at least one processor configured to:
   generate and display a graphical user interface including (i) a header region that includes user prompts and a login indicator, (ii) a filter region that includes a search field and one or more options for filtering search results, and (iii) a bottom region for displaying area recommendations,
receive, from a user, via the filter region of the graphical user interface, a query specifying a geographic location,
generate, using a trained machine learning model, a first travel score associated with a first destination of the plurality of travel destinations and a second travel score associated with a second destination of the plurality of travel destinations, the first travel score and the second travel score being based on at least one quality indicator associated with the respective travel destination, and the first travel score being higher than the second travel score, wherein the trained machine learning model is trained to predict travel scores for the plurality of travel destinations based on one or more features, related to the plurality of travel destinations, selected from the group consisting of: review rating, sentiment score, travel distance, trip length, and day trip ratio,
generate a list of area recommendations, wherein, in a case that the first destination is within a first predetermined distance from the geographic location specified in the query, the first destination is included in the list of area recommendations, and wherein, in a case that the second destination is within a second predetermined distance from the geographic location, the second destination is included in the list of area recommendations, the first predetermined distance being greater than the second predetermined distance,
rank-order the list of area recommendations, based on user information about the user,
select a subset of the rank-ordered list of area recommendations, based on a number of icons that can be displayed in the bottom region, and
generate and display to the user, in the bottom region, a plurality of icons, in response to the query, the subset of the rank-ordered list of area recommendations, wherein each icon corresponds to a respective area recommendation.

2. The system of claim 1, wherein the at least one processor is further configured to:
obtain, from the memory, a first set of user reviews, each review being associated with the first destination of the plurality of travel destinations;
determine, for each user review of the first set of user reviews, (1) a user rating, (2) an indication of user sentiment, and (3) an indication of travel time to the travel destination;
calculate, for the set of user reviews, (i) an average user rating, (ii) an average indication of user sentiment, and (iii) an average travel time; and
generate, based on one or more of the average user rating, the average indication of user sentiment, and the average travel time, the first travel score associated with the first destination.

3. The system of claim 2, wherein each of the average user rating, the average indication of user sentiment, and the average travel time is assigned a weight value, and
wherein the weight values are determined through the application of one or more supervised learning algorithms.

4. The system of claim 3, wherein the one or more supervised learning algorithms includes one or more of: a linear regression algorithm, a gradient boosted decision tree (GBDT) model, a neural network, and a supervised classification model.

5. The system of claim 1, wherein the at least one processor is further configured to:
associate the first travel score with a first rating group;
determine whether to display the first destination of the plurality of travel destinations to the user based on (1) the first predetermined distance from the geographic location specified in the query and (2) the first rating group.

6. The system of claim 2, wherein the at least one processor is further configured to:
determine, for each user review of the first set of user reviews, an indication of a user type;
generate, based on an aggregated analysis of user reviews, of the first set of users, that indicate a first common user type, the first travel score associated with the first destination; and
generate, based on an aggregated analysis of user reviews, of the first set of users, that indicate a second common user type, a second travel score associated with the first destination,
wherein the first travel score is different than the second travel score.

7. A method comprising:
obtaining, from a memory, data in association with each of a plurality of travel destinations, wherein the data includes, for each destination of the plurality of travel destinations, first data regarding a quality of the destination, second data regarding a travel convenience of the destination, and a travel score, the travel score being based on the first data and the second data;
generating and displaying a graphical user interface including (i) a header region that includes user prompts and a login indicator, (ii) a filter region that includes a search field and one or more options for filtering search results, and (iii) a bottom region for displaying travel destinations;
generating, using a trained machine learning model, a first travel score associated with a first destination of the plurality of travel destinations and a second travel score associated with a second destination of the plurality of travel destinations, the first travel score being higher than the second travel score, wherein the trained machine learning model is trained to predict travel scores for the plurality of travel destinations based on one or more features, related to the plurality of travel destinations, selected from the group consisting of: review rating, sentiment score, travel distance, trip length, and day trip ratio;
receiving, from a user, via the filter region of the graphical user interface, a query specifying a geographic location;
generating a list of travel destinations in response to the query, wherein, in a case that the first destination is within a first predetermined distance from the geographic location specified in the query, the first destination is included in the list of travel destinations, and wherein, in a case that the second destination is within a second predetermined distance from the geographic location, the second destination is included in the list of travel destinations, the first predetermined distance being greater than the second predetermined distance;
ordering the list of travel destinations, based on user information about the user;
selecting a subset of the ordered list of travel destinations, based on a number of icons that can be displayed in the bottom region; and generating and displaying to the user, in the bottom region, a plurality of icons, in response to the query, the subset of the ordered list of travel destinations, wherein each icon corresponds to a respective travel destination.

8. The method of claim 7, further comprising:
obtaining, from the memory, a first set of user reviews, each review being associated with the first destination of the plurality of travel destinations;
determining, for each user review of the first set of user reviews, (a) a user rating, (b) an indication of user sentiment, and (c) an indication of travel time to the travel destination;
calculating, for the set of user reviews, (a) an average user rating, (b) an average indication of user sentiment, and (c) an average travel time; and
generating, based on one or more of the average user rating, the average indication of user sentiment, and the average travel time, the first travel score associated with the first destination.

9. The method of claim 8, wherein each of the average user rating, the average indication of user sentiment, and the average travel time is assigned a weight value, and
wherein the weight values are determined through the application of one or more supervised learning algorithms.

10. The method of claim 9, wherein the one or more supervised learning algorithms includes one or more of: a linear regression algorithm, a gradient boosted decision tree (GBDT) model, a neural network, and a supervised classification model.

11. The method of claim 7, further comprising:
associating the first travel score with a first rating group;
determining whether to include a travel destination in the list of travel destinations based on (1) the first predetermined distance from the geographic location specified in the query, and (2) the first rating group.

12. The method of claim 8, further comprising:
determining, for each user review of the first set of user reviews, an indication of a user type;
generating, based on an aggregated analysis of user reviews, of the first set of users, that indicate a first common user type, the first travel score associated with the first destination; and
generating, based on an aggregated analysis of user reviews, of the first set of users, that indicate a second common user type, a second travel score associated with the first destination,
wherein the first travel score is different than the second travel score.

13. A non-transitory computer-readable storage medium comprising a first set of instructions directed to a retrieval function,
wherein the first set of instructions, when executed by one or more processors, cause the one or more processors to perform operations comprising:
obtaining, from a memory, information regarding a plurality of travel experiences, wherein the information comprises, for each travel experience of the plurality of travel experiences, a first experience attribute and a second experience attribute, and a location of the travel experience;
assigning, for each travel experience of the plurality of travel experiences, a first weight value to the first experience attribute and a second weight value to the second experience attribute;
calculating, for each travel experience, based on the first experience attribute, the first weight value, the second experience attribute, and the second weight value, an experience score for the travel experience, wherein the calculation is performed using a supervised linear regression model;
grouping each travel experience of the plurality of travel experiences into an experience group, of a plurality of experience groups, based on the experience score for the travel experience, wherein two experience groups of the plurality of experience groups respectively indicate a low interest travel experience and a high interest travel experience;
generating and displaying a graphical user interface including (i) a header region that includes user prompts and a login indicator, (ii) a filter region that includes a search field and one or more options for filtering search results, and (iii) a bottom region for displaying travel experiences;
receiving, from a user, via the filter region of the graphical user interface, a query from a user;
determining a location of the user;
generating, in response to the receipt of the query, a set of query results comprising one or more travel experiences, wherein the generation of the set of query results is based on, for each travel experience of the plurality of travel experiences, (1) a comparison of the location of the travel experience and the location of the user and (2) the experience group into which the travel experience has been grouped;
obtaining, from the memory, information regarding the user, wherein the information comprises user activity information and user preference information;
assigning a first weight value to the user activity information and a second weight value to the user preference information;
calculating, for each travel experience of the set of query results, based on the user activity information, the first weight value, the user preference information, and the second weight value, a user match score for the travel experience, wherein the calculation is performed using a supervised regression model;
generating an ordered list of query results in accordance with the calculation;
selecting a subset of the ordered list of travel destinations, based on a number of icons that can be displayed in the bottom region; and
displaying, to the user, in the bottom region, a plurality of icons, in response to the query, the subset of the ordered list of query results, wherein each icon corresponds to a respective travel destination.

14. The non-transitory computer-readable storage medium of claim 13, wherein the calculating of calculating of the experience for each travel experience further comprises:
obtaining, from the memory, a plurality of user reviews associated with a travel experience;
determining, for each user review, (a) a user rating and (b) an indication of user sentiment; and
calculating, for the set of user reviews, (a) an average user rating and (b) an aggregated indication of user sentiment;
wherein the first experience attribute is the average user rating and the second experience attribute is the aggregated indication of user sentiment.

15. The non-transitory computer-readable storage medium of claim 14, wherein each of the average user rating and the aggregated indication of user sentiment is assigned a weight value, and wherein the weight values are determined through the application of one or more supervised learning algorithms.

16. The non-transitory computer-readable storage medium of claim 13, wherein the supervised regression model used in the calculation of the user match score is a gradient boosted decision tree (GBDT) model.

17. The non-transitory computer-readable storage medium of claim 13, wherein the calculating of the experience score for each travel experience further comprises:
   obtaining, from the memory, a plurality of user reviews associated with a travel experience;
   determining, for each user review, one of: (a) a user rating, (b) an indication of user sentiment, (c) an indication of travel time to the travel destination, (d) an indication of travel distance to the travel destination, and (e) a user type; and
   calculating, as the first experience attribute for the travel experience, based on the set of user reviews, one of: (a) an average user rating and (b) an aggregated indication of user sentiment, (c) an average indication of travel time to the travel destination, (d) an average indication of travel distance to the travel destination, and (e) a common user type.

18. The system of claim 1, wherein the trained machine learning model is trained to predict travel scores for the plurality of travel destinations based on two or more features, related to the plurality of travel destinations, selected from the group consisting of: review rating, sentiment score, travel distance, trip length, and day trip ratio.

19. The system of claim 1, wherein the trained machine learning model is trained to predict travel scores for the plurality of travel destinations based on day trip ratio and one or more features, related to the plurality of travel destinations, selected from the group consisting of: review rating, sentiment score, travel distance, and trip length.

20. The system of claim 1, wherein the day trip ratio is a comparison of an amount of time taken by a destination compared to the trip length.

21. The system of claim 1, wherein the filter region of the graphical user interface includes a search field for receiving the query specifying the geographic location, and wherein the one or more options for filtering search results in the filter region are separate from the search field.

* * * * *